(12) United States Patent
Kim et al.

(10) Patent No.: US 10,551,030 B2
(45) Date of Patent: Feb. 4, 2020

(54) DISPLAY DEVICE COMPRISING THE SAME

(71) Applicant: Samsung Display Co., Ltd., Yongin-si, Gyeonggi-Do (KR)

(72) Inventors: Kyung-Min Kim, Hwaseong-si (KR); Sung-Kyu Shim, Seoul (KR); Yong-Hoon Kwon, Hwaseong-si (KR); Do Hun Kim, Masan-si (KR); Dong Hyeon Lee, Seoul (KR); Seung Hwan Chung, Asan-si (KR); Seung-Hwa Ha, Osan-si (KR); Se Ki Park, Asan-si (KR); Seong-Yong Hwang, Asan-si (KR); You Ra Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/673,106

(22) Filed: Aug. 9, 2017

(65) Prior Publication Data
US 2017/0336053 A1   Nov. 23, 2017

Related U.S. Application Data

(62) Division of application No. 13/784,496, filed on Mar. 4, 2013, now Pat. No. 9,752,753.

(30) Foreign Application Priority Data

Mar. 14, 2012 (KR) .......... 10-2012-0026165
Nov. 22, 2012 (KR) .......... 10-2012-0133180

(51) Int. Cl.
*G02F 1/1333* (2006.01)
*F21V 7/00* (2006.01)
(Continued)

(52) U.S. Cl.
CPC .......... *F21V 7/00* (2013.01); *G02B 6/0096* (2013.01); *G02F 1/133308* (2013.01);
(Continued)

(58) Field of Classification Search
CPC .. G02B 6/0088; G02B 6/0091; G02B 6/0096; F21V 7/0066; F21V 7/04–09
See application file for complete search history.

(56) References Cited

U.S. PATENT DOCUMENTS 4,630,895 A    12/1986  Abdala, Jr.
5,046,826 A     9/1991  Iwamoto et al.
(Continued)

FOREIGN PATENT DOCUMENTS

CN    101004507 A    7/2007
CN    101004515 A    7/2007
(Continued)

OTHER PUBLICATIONS

English Machine Translation of JP2006106212 provided by Espacenet.*
(Continued)

*Primary Examiner* — Zheng Song
(74) *Attorney, Agent, or Firm* — Innovation Counsel LLP

(57) ABSTRACT

Disclosed is a display device that can uniformly transmit light emitted from a light source to the entire display panel without using a light guide plate. The display device includes a display panel, a backlight assembly supplying light to the display panel, and a lower cover receiving the backlight assembly. The backlight assembly includes a light source, a circuit board mounted with the light source, and a reflection cover coupled to the circuit board to reflect light emitted from the light source and formed of a bendable plate type member.

11 Claims, 37 Drawing Sheets

(51) Int. Cl.
*F21V 8/00* (2006.01)
*G02F 1/1335* (2006.01)

(52) U.S. Cl.
CPC .......... *G02B 6/0083* (2013.01); *G02B 6/0085* (2013.01); *G02F 1/133553* (2013.01); *G02F 1/133555* (2013.01); *G02F 1/133605* (2013.01); *G02F 2001/133314* (2013.01)

(56) References Cited

U.S. PATENT DOCUMENTS

| | | | |
|---|---|---|---|
| 5,497,293 | A | 3/1996 | Noguchi et al. |
| 5,818,555 | A | 10/1998 | Yokoyama et al. |
| 6,053,619 | A | 4/2000 | Nakamura et al. |
| 6,257,737 | B1 | 7/2001 | Marshall et al. |
| 6,313,891 | B1* | 11/2001 | Nagakubo ............ G02B 6/0061 349/65 |
| 6,827,460 | B2 | 12/2004 | Higuchi |
| 6,864,930 | B2 | 3/2005 | Matsushita et al. |
| 7,566,146 | B2 | 7/2009 | Jeon |
| 7,905,616 | B2 | 3/2011 | Konno et al. |
| 7,946,747 | B2 | 5/2011 | Kim et al. |
| 8,054,407 | B2 | 11/2011 | Imojo et al. |
| 2001/0013911 | A1 | 8/2001 | Kim |
| 2003/0234896 | A1 | 12/2003 | Kim |
| 2004/0151007 | A1 | 8/2004 | Chuang |
| 2005/0231949 | A1 | 10/2005 | Kim et al. |
| 2006/0070280 | A1 | 4/2006 | Yamamura et al. |
| 2006/0203465 | A1* | 9/2006 | Chang ............... G02F 1/133603 362/23.18 |
| 2006/0203512 | A1 | 9/2006 | Ko et al. |
| 2007/0047262 | A1 | 3/2007 | Schardt et al. |
| 2007/0103938 | A1 | 5/2007 | Chang et al. |
| 2007/0121343 | A1 | 5/2007 | Brown |
| 2007/0171676 | A1* | 7/2007 | Chang ................. G02B 6/0046 362/613 |
| 2008/0192507 | A1 | 8/2008 | Chang |
| 2009/0059121 | A1 | 3/2009 | Konno et al. |
| 2009/0310366 | A1 | 12/2009 | Huang et al. |
| 2010/0134722 | A1* | 6/2010 | Huang ................. G02B 6/0031 349/65 |
| 2010/0214777 | A1* | 8/2010 | Suehiro .................. F21V 7/005 362/235 |
| 2010/0271843 | A1 | 10/2010 | Holten et al. |
| 2011/0007506 | A1 | 1/2011 | Kinoshita |
| 2011/0096529 | A1 | 4/2011 | Wheatley et al. |
| 2011/0134659 | A1* | 6/2011 | Aastuen ................. G02B 6/002 362/609 |
| 2011/0149597 | A1 | 6/2011 | Jao et al. |
| 2011/0164404 | A1 | 7/2011 | Kasai |
| 2011/0222267 | A1 | 9/2011 | Park |
| 2011/0267839 | A1* | 11/2011 | Kang ................... G02B 6/0096 362/609 |
| 2011/0286202 | A1 | 11/2011 | Kim et al. |
| 2012/0014134 | A1* | 1/2012 | Fang .................... G02B 6/0073 362/612 |
| 2012/0113676 | A1 | 5/2012 | Van Dijk et al. |
| 2012/0113679 | A1 | 5/2012 | Boonekamp |
| 2012/0154691 | A1 | 6/2012 | Cho |
| 2012/0212976 | A1 | 8/2012 | Chen |
| 2013/0058126 | A1 | 3/2013 | Kim et al. |
| 2013/0235589 | A1* | 9/2013 | Ohno .................... F21V 7/0066 362/301 |
| 2013/0258244 | A1* | 10/2013 | Fang .................... G02B 6/0055 349/62 |
| 2013/0258245 | A1 | 10/2013 | Fang |
| 2013/0272022 | A1 | 10/2013 | Choi et al. |
| 2013/0336001 | A1 | 12/2013 | Boonekamp |

FOREIGN PATENT DOCUMENTS

| | | |
|---|---|---|
| CN | 101017280 A | 8/2007 |
| CN | 101514789 A | 8/2009 |
| CN | 101858566 A | 10/2010 |
| JP | 08-190021 A | 7/1996 |
| JP | 2001-060411 | 3/2001 |
| JP | 2001-084821 | 3/2001 |
| JP | 2001-084822 | 3/2001 |
| JP | 2004-127918 A | 4/2004 |
| JP | 2004-288498 A | 10/2004 |
| JP | 2006106212 * | 10/2004 |
| JP | 2005-097393 A | 4/2005 |
| JP | 2006-058808 A | 3/2006 |
| JP | 2006106212 | 4/2006 |
| JP | 2006310221 | 11/2006 |
| JP | 2009-026584 A | 2/2009 |
| JP | 2009-064614 A | 3/2009 |
| JP | 2009-129809 A | 6/2009 |
| JP | 2009-152043 A | 7/2009 |
| JP | 2009-259548 | 11/2009 |
| JP | 2010-072262 | 4/2010 |
| JP | 2011-053309 | 3/2011 |
| JP | 2011-509500 A | 3/2011 |
| JP | 2011-513897 A | 4/2011 |
| KR | 10-1997-0048769 | 7/1997 |
| KR | 10-0176190 | 11/1998 |
| KR | 10-2000-0008458 | 2/2000 |
| KR | 10-0621672 | 8/2006 |
| KR | 10-2007-0064752 | 6/2007 |
| KR | 10-2008-0012600 | 2/2008 |
| KR | 10-2008-0016188 | 2/2008 |
| KR | 10-0880217 | 1/2009 |
| KR | 10-2009-0025700 | 3/2009 |
| KR | 10-2010-0134904 | 12/2010 |
| KR | 10-2011-0014046 | 2/2011 |
| KR | 10-2011-0019388 A | 2/2011 |
| KR | 10-1047704 | 7/2011 |
| KR | 10-2011-0104398 | 9/2011 |
| KR | 10-2011-0104401 | 9/2011 |
| KR | 10-2012-0003271 | 1/2012 |
| KR | 10-2012-0003276 | 1/2012 |
| KR | 10-2012-0003280 | 1/2012 |
| KR | 10-2012-0004222 | 1/2012 |
| KR | 10-1137843 | 4/2012 |
| KR | 10-2012-0050171 | 5/2012 |
| KR | 10-2013-0025262 | 3/2013 |
| KR | 10-2013-0074505 | 7/2013 |
| KR | 10-2013-0116704 | 10/2013 |
| WO | 2009/077979 | 6/2009 |
| WO | 2009/105450 A1 | 8/2009 |
| WO | 2009/149010 A1 | 12/2009 |

OTHER PUBLICATIONS

Kimura, Shunsuke, JP2006310221, Nov. 9, 2006, English Translation, pp. 1-7.

Karantaru, Kariru, JP2006106212, Apr. 20, 2006, Machine Translation from Espacenet and English Abstract, pp. 1-2.

* cited by examiner

DISPLAY DEVICE COMPRISING THE SAME

CROSS-REFERENCE TO RELATED APPLICATION

This application is a divisional application of U.S. patent application Ser. No. 13/784,496 filed on Mar. 4, 2013, which claims priority to Korean Patent Application No. 10-2012-0026165, filed in the Korean Intellectual Property Office (KIPO) on Mar. 14, 2012 and Korean Patent Application No. 10-2012-0133180 filed in the Korean Intellectual Property Office (KIPO) on Nov. 22, 2012, and all the benefits accruing therefrom under 35 U.S.C. § 119, the contents of the prior applications being herein incorporated by reference

BACKGROUND

(a) Field

Embodiments of the present invention relate to a display device, and more particularly, a display device that can uniformly transmit light emitted from a light source to the entire display panel without using a light guide plate.

(b) Description of the Related Art

A display device is widely used for a computer monitor, a television, a mobile phone and the like. The display device includes a cathode ray tube display device, a liquid crystal display, a plasma display device, and the like.

The liquid crystal display, which is one of the most common types of flat panel displays currently in use, includes two display panels with field generating electrodes such as a pixel electrode and a common electrode and a liquid crystal layer interposed therebetween. The liquid crystal display induces electric fields across the liquid crystal layer by applying voltage to the field generating electrodes, determines the alignment of liquid crystal molecules of the liquid crystal layer by the induced electric field, and controls polarization of incident light, thereby displaying images.

Since the liquid crystal display is not a self-emissive device, a light source is needed. The light source may be a separately mounted artificial light source or natural light. In the case of the artificial light source, a light guide plate (LGP) is required in order to guide emitted light to the entire display panel with uniform luminance.

The light guide plate is vulnerable to deformation due to heat generated from a light source. In addition, it costs a lot of money to manufacture the light guide plate, which increases manufacturing costs of a display device.

The above information disclosed in this Background section is only for enhancement of understanding of the background of the invention and therefore it may contain information that does not form the prior art that is already known in this country to a person of ordinary skill in the art.

SUMMARY

Embodiments of the present invention has been made in an effort to provide display device having advantages of uniformly transmitting light emitted from a light source to the entire display panel without using a light guide plate.

An exemplary embodiment of the present invention provides a display device, including: a display panel; a backlight assembly supplying light to the display panel; and a lower cover receiving the backlight assembly, in which the backlight assembly includes a light source; a circuit board mounted with the light source; and a reflection cover coupled to the circuit board to reflect light emitted from the light source and formed of a bendable plate type member.

The reflection cover may include a first reflection portion and a second reflection portion formed to surround an upper side and a lower side of a main emission direction of light emitted from the light source; and a connection portion connecting the first reflection portion and the second reflection portion.

The first reflection portion and the second reflection portion may be formed so that the second reflection portion is longer than the first reflection portion.

The connection portion of the reflection cover may be coupled to the circuit board, the connection portion may include an opening formed at a position where the light source is mounted and having a size equal to or larger than that of the light source, and the light source may be exposed through the opening.

The display device may further include a first fastening member penetrating the connection portion of the reflection cover and the circuit board to couple the reflection cover and the circuit board.

The display device may further include a heat radiation member formed between the reflection cover and the circuit board.

The display device may further include a reflector partially overlapping the second reflection portion of the reflection cover and having a shape in which the reflector bends at least once at a portion where the reflector does not overlap the reflection cover.

A length from the connection portion to a bending portion of the reflector may be 0.2 times or more and 0.5 times or less a length from the connection portion to an end of the reflector.

The length from the connection portion to the bending portion of the reflector may be 0.3 times or more and 0.4 times or less the length from the connection portion to the end of the reflector.

The lower cover may include a bottom surface and sides extending and bending from the bottom surface, the circuit board may be coupled to at least any one of the sides of the lower cover, and the reflection cover may be coupled to the bottom surface of the lower cover.

The reflection cover may include a first reflection portion and a second reflection portion formed to surround an upper side and a lower side of the main emission direction of light emitted from the light source; and a connection portion connecting the first reflection portion and the second reflection portion.

The first reflection portion and the second reflection portion may be formed so that the second reflection portion is longer than the first reflection portion.

The display device may further include a reflector partially overlapping the second reflection portion of the reflection cover and having a shape in which the reflector bends at least once at a portion where the reflector does not overlap the reflection cover.

A length from the connection portion to a bending portion of the reflector may be 0.2 times or more and 0.5 times or less a length from the connection portion to an end of the reflector.

The length from the connection portion to the bending portion of the reflector may be 0.3 times or more and 0.4 times or less the length from the connection portion to the end of the reflector.

The first reflection portion and the second reflection portion may form a single parabola in a cross section parallel with the emission direction of light, the parabola may follow the following equation, $$(y-\beta)^2=4p(x-\alpha)$$

(an x axis represents the main emission direction of the light, a y axis represents a direction vertical to the x axis, $\beta$ represents a distance between a center and a focus of the parabola, $\alpha$ represents an x coordinate of the parabolic focus, and p represents a parabolic curvature), and the connection portion may be formed in a direction parallel with the y axis.

The sides of the lower cover may include a first side to which the circuit board is coupled; and a second side facing the first side, the bottom surface of the lower cover may include a first bottom surface connected to the first side; a second bottom surface formed deeper from an upper end of the first side than the first bottom surface; a first inclined portion connecting the first bottom surface and the second bottom surface; and a second inclined portion extending from the second bottom surface and formed so that a depth from the upper end of the first side decreases as the distance from the second bottom surface increases, and a first bending portion where the first bottom surface and the first inclined portion meet each other may support the second reflection portion of the reflection cover.

A length from the first side to a second bending portion where the second bottom surface and the second inclined portion meet each other may be 0.2 times or more and 0.5 times or less a length from the first side to the second side.

The length from the first side to the second bending portion where the second bottom surface and the second inclined portion meet each other may be 0.3 times or more and 0.4 times or less the length from the first side to the second side.

The display device may further include a reflector partially overlapping the second reflection portion of the reflection cover and having a shape in which the reflector bends at least once at a portion where the reflector does not overlap the reflection cover.

A length from the connection portion to the bending portion of the reflector may be 0.2 times or more and 0.5 times or less the length from the connection portion to the end of the reflector.

The length from the connection portion to the bending portion of the reflector may be 0.3 times or more and 0.4 times or less the length from the connection portion to the end of the reflector.

The reflector may be formed on the lower cover and have a shape in which the reflector bends at a second bending portion where the second bottom surface and the second inclined portion meet each other and a third bending portion where the second inclined portion and the second side meet each other.

The reflection cover and the lower cover may be integrally formed and bend at least once.

The length from the connection portion to the bending portion of the reflector may be 0.2 times or more and 0.5 times or less the length from the connection portion to the end of the reflector.

The length from the connection portion to the bending portion of the reflector may be 0.3 times or more and 0.4 times or less the length from the connection portion to the end of the reflector.

The circuit board may comprise two circuit boards and the two circuit boards and the two circuit boards may be coupled to two sides facing each other among the sides of the lower cover, respectively, and the display device may further include a reflector having a shape in which a distance from the display panel and the reflector increases from the center of the display panel between the two sides toward the two sides.

The circuit board may be coupled to all of the sides of the lower cover, and the display device may further include a reflector having a shape in which a distance from the display panel and the reflector increases from the center of the display panel toward the sides of the lower cover.

The main emission direction of light emitted from the light source may form an angle of more than 0 degree and 20 degrees or less with the display panel.

An angle, which the lower cover forms with a surface coupled with the circuit board, may be more than 0 degree and 20 degrees or less.

The angle, which the lower cover forms with the surface coupled with the circuit board, may be more than 10 degree and 15 degrees or less.

Yet another exemplary embodiment of the present invention provides a display device, including: a display panel; a backlight assembly supplying light to the display panel; and a lower cover receiving the backlight assembly, wherein the backlight assembly includes: a light source; a circuit board mounted with the light source; and a reflection cover coupled to the circuit board, the reflection cover includes: a first reflection portion formed to surround an upper side of a main emission direction of light emitted from the light source; a second reflection portion formed to surround a lower side of the main emission direction of the light; and a connection portion connecting the first reflection portion and the second reflection portion, and at least a portion of the first reflection portion is made of a material that enables a portion of the light to pass through.

The first reflection portion may not overlap the display panel or may overlap a non-display area of the display panel.

At least a portion of the first reflection portion may include PC or PMMA.

The first reflection portion may include a reflective portion made of a metal material; and a transflective portion made of a transflective material. The transflective portion may be positioned at a point further away from the light source than the reflective portion.

The reflective portion and the transflective portion may partially overlap. The display device according to the exemplary embodiment of the present invention may further include an adhesive member formed between the reflective portion and the transflective portion to connect the reflective portion and the transflective portion in a portion where the reflective portion and the transflective portion overlap.

The reflective portion and the transflective portion may partially overlap. The display device may further include a fastening member coupling the reflective portion and the transflective portion in a portion where the reflective portion and the transflective portion overlap.

The entire first reflection portion may be made of a transflective material.

The display device may further include a reflection sheet attached on at least a portion of a light-incident surface of the first reflection portion.

The light source may be disposed so that the main emission direction of the light is parallel with the display panel or faces a bottom surface of the lower cover.

The second reflection portion may be formed from one side of the lower cover to reach an opposite side facing the one side, and may bend at least once.

At least a portion of a light-incident surface of the first reflection portion may be mirror-like finished or roughness processed.

The display device may further include a light adjustment pattern formed on a light-incident surface of the reflection cover.

Still another exemplary embodiment of the present invention provides a display device including: a display panel; a backlight assembly supplying light to the display panel; and a lower cover receiving the backlight assembly, wherein the backlight assembly includes: a light source; a circuit board mounted with the light source; and a reflection cover coupled to the circuit board, the reflection cover includes: a first reflection portion formed to surround an upper side of a main emission direction of light emitted from the light source; a second reflection portion formed to surround a lower side of the main emission direction of the light; and a connection portion connecting the first reflection portion and the second reflection portion, and the light source is disposed so that the main emission direction of the light faces a bottom surface of the lower cover.

The first reflection portion may have a bending shape.

The first reflection portion may be provided in an upwardly convex shape.

The first reflection portion may be provided in a downwardly convex shape.

The first reflection portion may be formed to be flat in a direction parallel with the main emission direction of the light.

The light source may be disposed so that an angle, which the main emission direction of the light forms with the display panel, is more than 0 degrees and 20 degrees or less.

At least a portion of the first reflection portion may be made of a material that enables a portion of the light to pass through.

At least a portion of the first reflection portion may include PC or PMMA.

The first reflection portion may be made of a reflective material.

An exemplary embodiment of the present invention provides a display device including a display panel, a backlight assembly supplying light to the display panel, an optical sheet formed on the backlight assembly, and a lower cover receiving the backlight assembly. The backlight assembly may include a plurality of light sources formed along an side of the back light assembly, a reflection cover including a first reflection portion formed to surround an upper side of a main emission direction of light emitted from the light sources, and a second reflection portion formed to surround a lower side of the main emission direction of the light. The second reflection portion may be disposed directly below the optical sheet.

A main emission direction of light emitted from the plurality of light sources may form an angle of more than 0 degree and 20 degrees or less with the display panel The first reflection portion may have a transflective portion and a reflective portion, and the transflective portion may be positioned at a point further away from the plurality of light sources than the reflective portion.

The display device may further comprise a light adjustment pattern formed on a light-incident surface of the first reflection cover.

The display device according to an exemplary embodiment of the present have the following effects.

The present invention can uniformly transmit light emitted from the light source to the entire display panel without using a light guide plate by forming the reflection cover that is coupled to the circuit board mounted with the light source to reflect light and is formed of the plate type member.

Further, it is possible to reduce manufacturing costs by forming a reflection cover with a thin plate type member.

Further, it is possible to prevent heat coming from a light source unit from being transferred to a display panel by forming at least a portion of an upper side area of a reflection cover using transflective material.

DETAILED DESCRIPTION OF THE EMBODIMENTS

Figure 1:
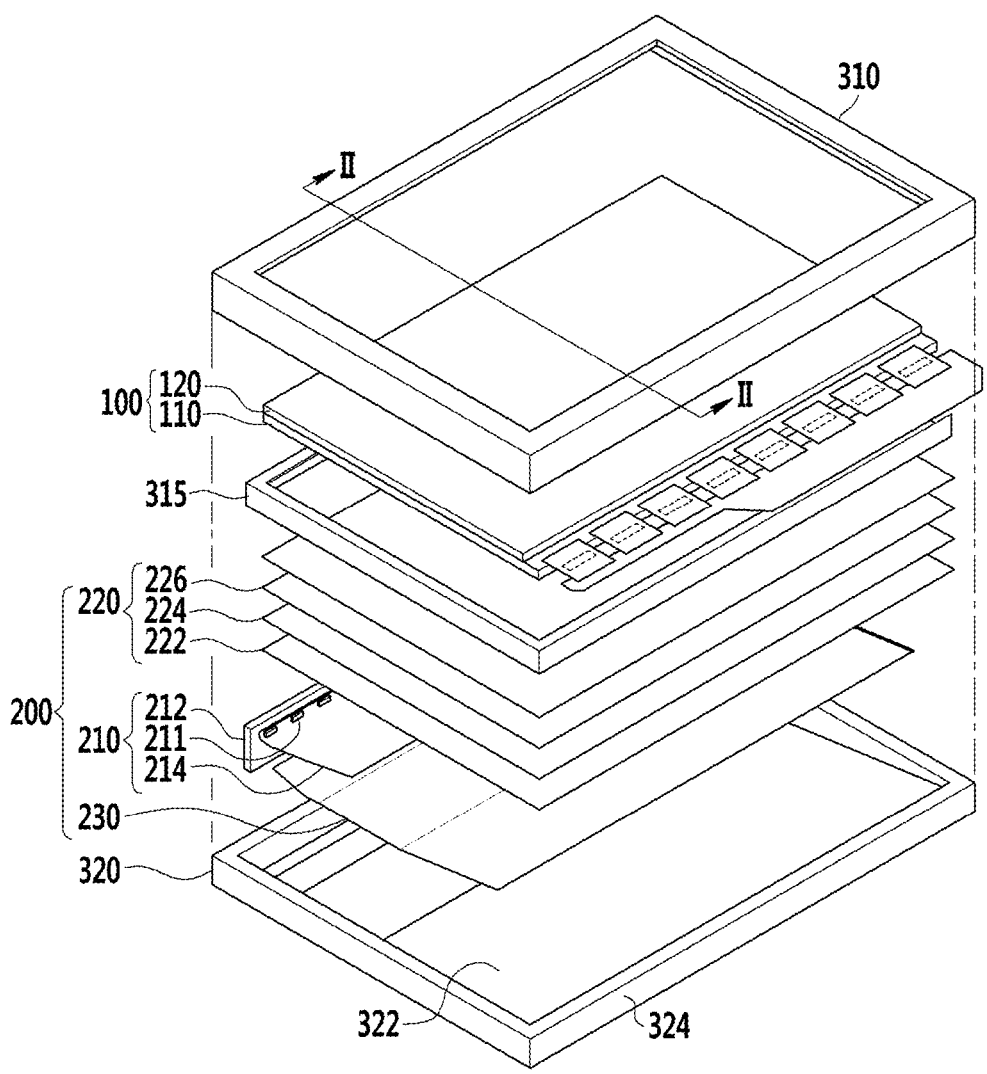
FIG. 1 is an exploded perspective view showing a display device according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a backlight assembly and a display device including the same according to a first exemplary embodiment of the present invention will be described below with reference to the accompanying drawings.

FIG. 1 is an exploded perspective view showing a display device according to a first exemplary embodiment of the present invention.

As shown in FIG. 1, the display device according to the first exemplary embodiment of the present invention generally includes a backlight assembly 200 supplying light and a display panel 100 receiving the light from the backlight assembly 200 to display an image. Further, in order to fix the backlight assembly 200 and the display panel 100, an upper cover 310, a mold frame 315 and a lower cover 320 are coupled to each other.

The backlight assembly 200 includes a light source unit 210 supplying light, an optical sheet 220 disposed below the display panel 100, and a reflector 230 reflecting light emitted from the light source unit 210.

The light source unit 210 is disposed below any one side of the display panel 100, and includes a light source 211 generating light, a circuit board 212 mounted with the light source 211, and a reflection cover 214 coupled to the circuit board 212.

The light source 211 may include a plurality of light emitting members, and the light emitting member may be, for example, a light emitting diodes (LEDs).

The circuit board 212 is electrically connected to the light source 211 to supply a signal for driving the light source 211.

The reflection cover 214 reflects light emitted from the light source 211 and a specific shape of the reflection cover 214 will be described below with reference to FIGS. 3 to 5 in more detail.

The optical sheet 220 improves efficiency of light emitted from the light source unit 210 and allows light to be uniformly distributed throughout the display panel. The optical sheet 220 may be a plurality of sheets, and for example, include a diffuser sheet 222, a prism sheet 224 and a protecting sheet 226 which are sequentially stacked.

The diffuser sheet 222 diffuses light emitted from the light source unit 210. The prism sheet 224 collects light diffused by the diffuser sheet 222 in a direction vertical to a plane of the display panel 100. Most of the light passing through the prism sheet 224 is vertically incident on the display panel 100. The protecting sheet 226 may be disposed on the prism sheet 224, and protect the prism sheet 224 against external impact.

The optical sheet 220 including one diffuser sheet 222, one prism sheet 224 and one protecting sheet 226 is exemplified, but the present invention is not limited thereto. The optical sheet 220 may include a plurality of sheets of at least any one of the diffuser sheet 222, the prism sheet 224 and the protecting sheet 226, and any one sheet may be omitted if necessary.

The reflector 230 is disposed on the lower cover 320. The reflector 230 changes a light path toward the display panel 100 so as to prevent the light emitted from light source unit 210 from being lost to outside. A shape of the reflector 230 will be described below with reference to FIG. 2 and FIGS. 6 to 11 in more detail.

As the display panel 100, various display panels such as a liquid crystal display (LCD) panel and an electrophoretic display panel (EDP) may be used.

When a liquid crystal display panel is used, the liquid crystal display panel 100 is configured such that the first substrate 110 and the second substrate 120 are attached while facing each other and a liquid crystal layer (not shown) is formed between the first substrate 110 and the second substrate 120. Although not shown, on the first substrate 110, a plurality of gate lines and data lines, and a thin film transistor connected the gate lines and the data lines are formed. Further, a pixel electrode, which is applied with a signal from the data line when the thin film transistor is turned on by a signal applied from the gate line, is formed.

A common electrode may be formed on the first substrate 110 or the second substrate 120, and an electric field is formed between the pixel electrode and the common electrode to control the alignment of liquid crystal molecules of the liquid crystal layer. Accordingly, the light incident from the backlight assembly 200 is controlled, thus displaying an image.

The upper cover 310 is formed to surround an upper edge and the side of the display panel 100 to support a front edge of the display panel 100.

The mold frame 315 is formed between the upper cover 310 and the lower cover 320 and includes the side surrounding the display panel 100 and a surface protruding from the side to receive the display panel 100. The display panel 100 is received at an upper part based on the protruding surface of the mold frame 315 and the backlight assembly 200 is formed therebelow.

The lower cover 320 includes a bottom surface 322 and sides 324 extending and bending from the bottom surface 322 in order to receive the backlight assembly 200. The display panel 100 may be formed in a quadrangle as shown in the drawing, and thus, the number of the sides 324 of the lower cover 320 may be four. The lower cover 320 may be coupled with the upper cover 310, such that the display panel 100 and the backlight assembly 200, which are positioned therein, may be fixed.

Hereinafter, some constituent elements of the display device according to the first exemplary embodiment of the present invention will be described in more detail.

Figure 2:
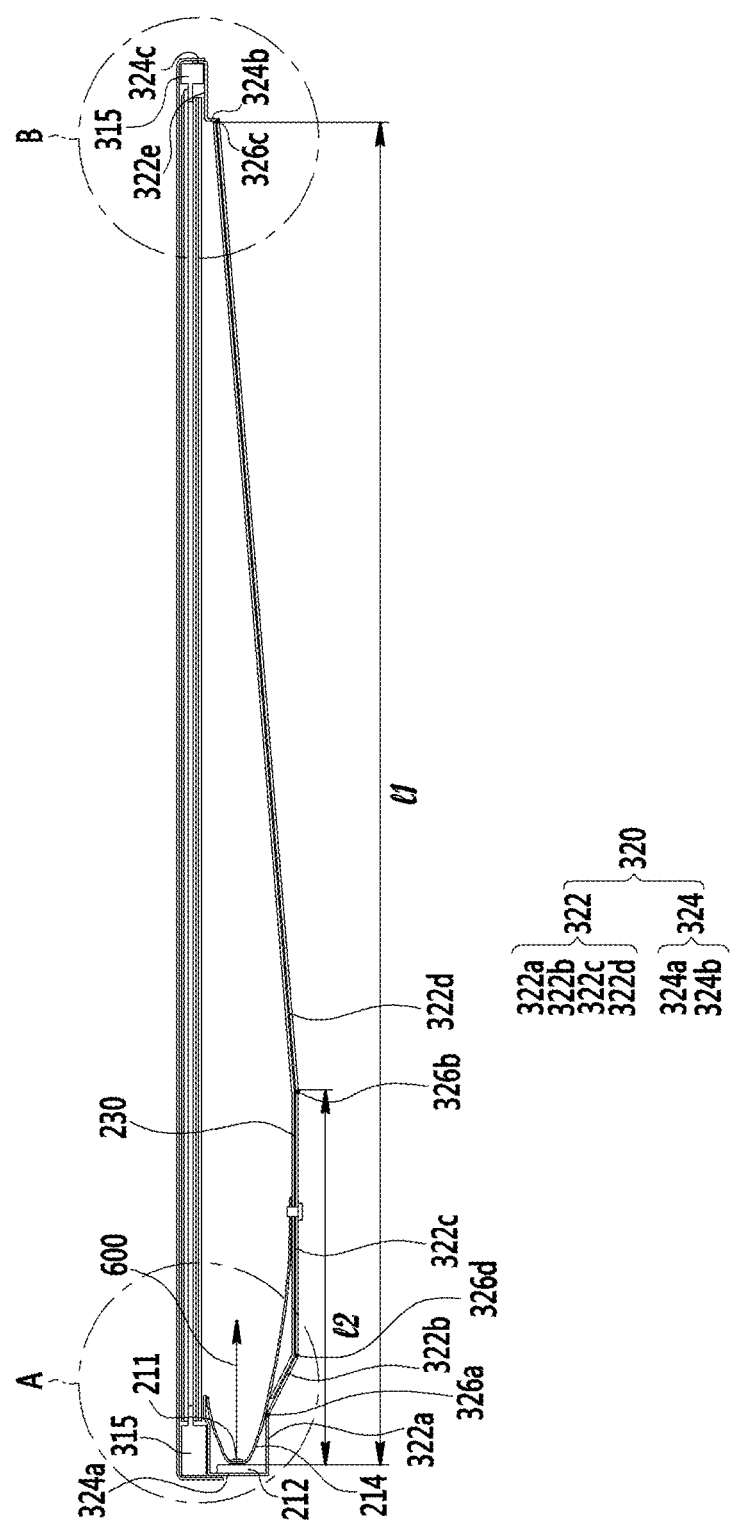
FIG. 2 is a cross-sectional view showing the display device according to the first exemplary embodiment of the present invention taken along line II-II of FIG. 1.

FIG. 2 is a cross-sectional view showing the display device according to the first exemplary embodiment of the present invention taken along line II-II' of FIG. 1.

A bottom surface 322 of a lower cover 320, which is positioned at the lowest part of the display device, may be bent several times. Referring to FIG. 2, the bottom surface 322 of the lower cover 320 includes a first bottom surface 322a and a second bottom surface 322c having surfaces parallel with the display panel 100, a first inclined portion 322b connecting the first bottom surface 322a and one end of the second bottom surface 322c, and a second inclined portion 322d extending from the other end of the second bottom surface 322c.

The light source unit 210 is coupled to one of the sides 324 of the lower cover 320. The sides 324 of the lower cover 320 include a first side 324a to which the light source unit 210 is coupled, and a second side 324b which faces the first side 324a. The first side 324a of the lower cover 320 is coupled to, particularly, the circuit board 212 of the light source unit 210.

The first bottom surface 322a of the lower cover 320 is connected to the first side 324a and the second inclined portion 322d is connected to the second side 324b.

The second bottom surface 322c is formed deeper from an upper end of the first side 324a than the first bottom surface 322a. Further, the second inclined portion 322d is formed so that a depth thereof from the upper end of the first side 324a decreases as the distance from the second bottom surface 322c increases.

The lower cover 320 may further include a third bottom surface 322e connected to the second side 324b to have a surface parallel with the display panel 100 and a third side 324c extending and bending from the third bottom surface 322e. The third bottom surface 322e and the third side 324c support the mold frame 315, and may be coupled to the upper cover 310.

The circuit board 212 includes an upper surface and a lower surface. The light source 211 is mounted on the upper surface of the circuit board 212. The lower surface of the circuit board 212 is coupled to the first side 324a of the lower cover 320. Therefore, the light source 211 mainly emits light in a direction which the upper surface of the circuit board 212 faces. The direction is called a main emission direction 600 of light and is parallel with the upper surface and/or the lower surface of the display panel 100.

In a display device in the related art, a light guide plate (LGP) is used so as to guide light emitted from the light source to the display panel 100. The first exemplary embodiment of the present invention has a configuration that can uniformly transmit light to the display panel 100 without using the light guide plate. The reflection cover 214 and the reflector 230 are used to accomplish this purpose and the structure of which will be described below in more detail.

First, the reflection cover will be described in more detail with reference to FIGS. 3 to 5.

Figure 3:
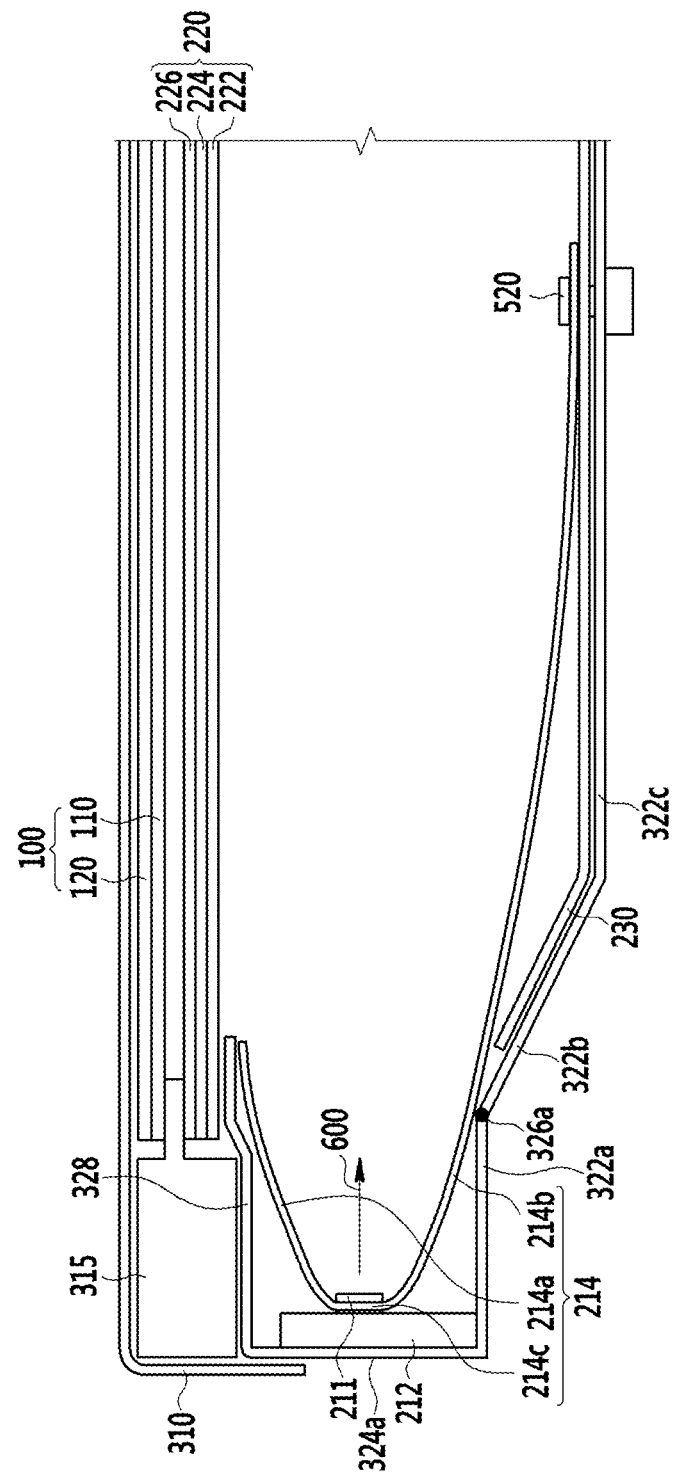
FIG. 3 is an enlarged cross-sectional view of portion A of FIG. 2.
Figure 4:
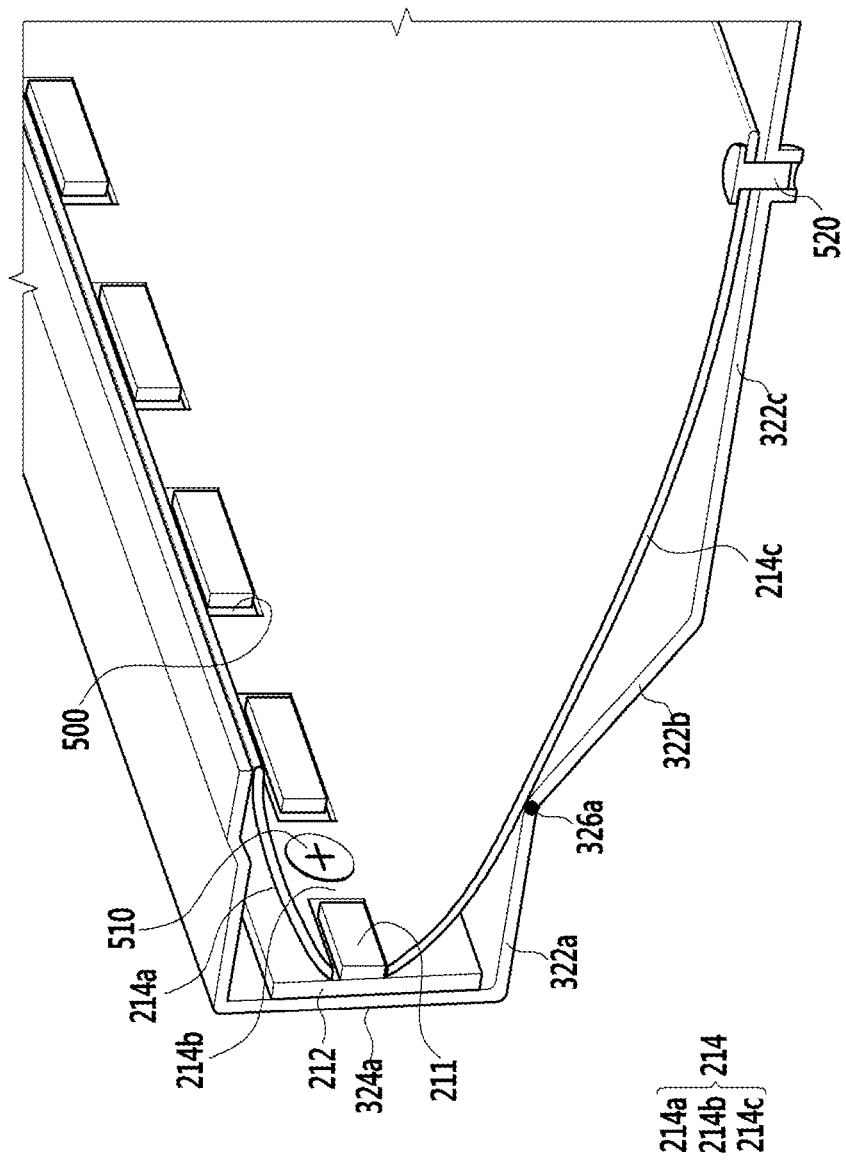
FIG. 4 is an enlarged perspective view including the same cross section as FIG. 3.
Figure 5:
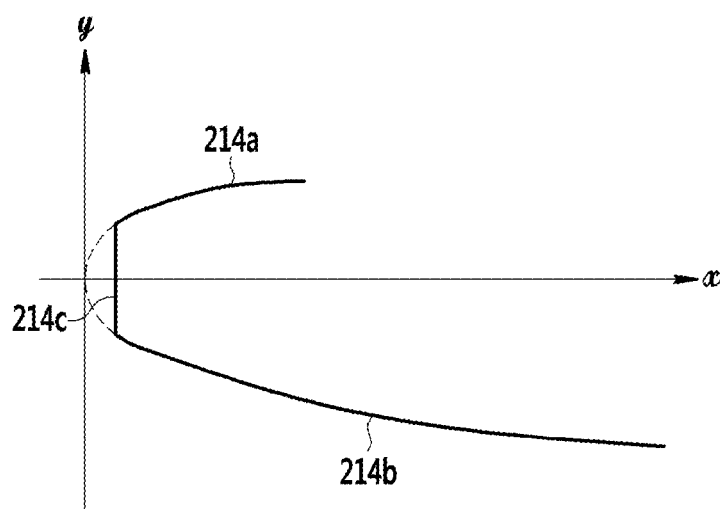
FIG. 5 is a drawing showing a shape of a reflection cover of the display device according to the first exemplary embodiment of the present invention with an x axis and a y axis.

FIG. 3 is an enlarged cross-sectional view of portion A of FIG. 2, FIG. 4 is an enlarged perspective view including the same cross section as FIG. 3, and FIG. 5 is a drawing showing a shape of a reflection cover of the display device according to the first exemplary embodiment of the present invention along an x axis and a y axis.

The reflection cover 214 is made of a material that reflects light and is formed of a bendable plate type member. For example, the reflection cover 214 may be made of SUS or aluminum. In order to fully reflect light, the surface of the reflection cover 214 may be finished to have a mirror-like surface or a specular reflection sheet may be attached to the surface thereof. Alternatively, a polymer having a reflection function may be integrated with the reflection cover 214. In this case, a material having the reflectance of 90% or more may be used or the material may be processed so that the reflectance becomes 90% or more. A surface of the reflection cover 214, which reflects light emitted from the light source 211, may have reflectance larger than or equal to that of a surface positioned at an opposite side thereto.

Since the reflection cover 214 is formed of the plate type member having high reflection efficiency, manufacturing costs and the weight of the display can be reduced dramatically. And a shape of the reflection cover 214 can be easily altered to thereby simplify a manufacturing process.

The reflection cover 214 includes a first reflection portion 214a and a second reflection portion 214b which are formed to surround an upper side and a lower side of the main emission direction 600 of light emitted from the light source 211, and a connection portion 214c which connects the first reflection portion 214a and the second reflection portion 214b.

The first reflection portion 214a has a curved surface, and curves from the connection portion 214c toward a point where the display panel 100 is positioned.

The lower cover 320 may further include an upper surface 328 that extends and bends from an upper end of the first side 324a to support a lower surface of the mold frame 315. The first reflection portion 214a is located below the upper surface 328 of the lower cover 320.

The second reflection portion 214b is formed of a curved surface and curves from the connection portion 214c to reach the bottom surface 322 of the lower cover 320.

A first bending portion 326a is formed at a point where the first bottom surface 322a and the first inclined portion 322b of the lower cover 320 meet each other, and supports the second reflection portion 214b to maintain a shape of the second reflection portion 214b.

The second reflection portion 214b comes in contact with the reflector 230 and may be coupled to the reflector 230. For example, a second fastening member 520, which penetrates the second reflection portion 214b and the reflector 230 to couple the reflection cover 214 and the reflector 230, may be formed Further, the second fastening member 520 penetrates the lower cover 320, such that the reflection cover 214 is also coupled to the lower cover 320. The drawing shows an example that the second fastening member 520 is a screw, but the present invention is not limited thereto and the reflection cover 214 and the lower cover 320 may be coupled to each other by a double-sided adhesive tape or the like.

The connection portion 214c may be coupled to a front surface of the circuit board 212. A first fastening member 510, which penetrates the connection portion 214c and the circuit board 212 to couple the reflection cover 214 and the circuit board 212, may be formed. The drawing shows an example that the first fastening member 510 is a screw, but the present invention is not limited thereto and the reflection cover 214 and the circuit board 212 may be coupled by a double-sided adhesive tape or the like.

A heat radiation member (not shown) may be further formed between the connection portion 214c of the reflection cover 214 and the circuit board 212. As the heat radiation member, for example, a heat radiating tape may be used. Therefore, the reflection cover 214 serves as a heat radiation fin of the circuit board 212, thereby increasing heat radiating efficiency of the light source 211.

The connection portion 214c further includes an opening 500 which is formed to correspond to a position where the light source 211 is mounted. The opening 500 has a size equal to or larger than that of the light source 211. The light source 211 is exposed through the opening 500, and light is emitted to the main emission direction 600 of light from the light source 211. The light source 211 may include the plurality of light emitting members and the opening 500 is formed correspondingly to the number of light emitting members.

As described above, the connection portion 214c is coupled to the front surface of the circuit board 212, but the present invention is not limited thereto and the connection portion 214c may be coupled to a rear surface of the circuit board 212.

However, when the connection portion 214c is coupled to the rear surface of the circuit board 212, light emitted from the light source 211 reaches the front surface of the circuit board 212, and thus, is not fully reflected. As a result, a temperature of the circuit board 212 may be increased by the heat from the light source. On the other hand when the connection portion 214c is coupled to the front surface of the circuit board 212 and the light source 211 is exposed through the opening 500, light emitted from the light source 211 does not reach the front surface of the circuit board 212 but is reflected by the reflection cover 214, thereby improving reflection efficiency. Further, the light from the light source can be prevented from reaching to the circuit board 212, thereby preventing a temperature rise.

Referring to FIG. 5, it can be seen that the first reflection portion 214a and the second reflection portion 214b form a single parabola. A parabolic equation may be represented by the following Equation 1.

$$(y-\beta)^2 = 4p(x-\alpha) \quad \text{(Equation 1)}$$

Here, an x axis represents the main emission direction 600 of light, a y axis represents a direction vertical to the x axis, β represents a distance between a center and a focus of the parabola, α represents an x-coordinate of the parabolic focus, and p represents a curvature of the parabola.

The first reflection portion 214a is positioned at an upper side of the x-axis, and the second reflection portion 214b is positioned at a lower side of the x-axis. A y-axis value for an x-axis value of the parabola may have two values except for the focus. A line connecting two points corresponding to one x-axis value constitutes the connection portion 214c. The connection portion 214c is formed in a direction parallel with the y axis.

A length of the second reflection portion 214b is longer than that of the first reflection portion 214a. The first reflection portion 214a may be formed to have a length so as not to cover a display area of the display panel 100. The second reflection portion 214b may be formed to have an optimal length so that the second reflection portion 214b is longer than the first reflection portion 214a and reflects the light emitted from the light source 211 when the light deviates from the main emission direction 600 of light to supply the light to the display panel 100.

In the first exemplary embodiment of the present invention, the second reflection portion 214b is formed from the connection portion 214c up to a position where the second fastening member 520 is formed and the second reflection portion 214b of the reflection cover 214 overlaps the reflector 230.

Unlike this, the reflector 230 may not be separately formed, and in this case, the second reflection portion 214b may be formed to reach the second side 324b of the lower cover 320.

Next, the reflector will be described in more detail with reference to FIG. 2, and FIGS. 6 to 11.

Figure 11:
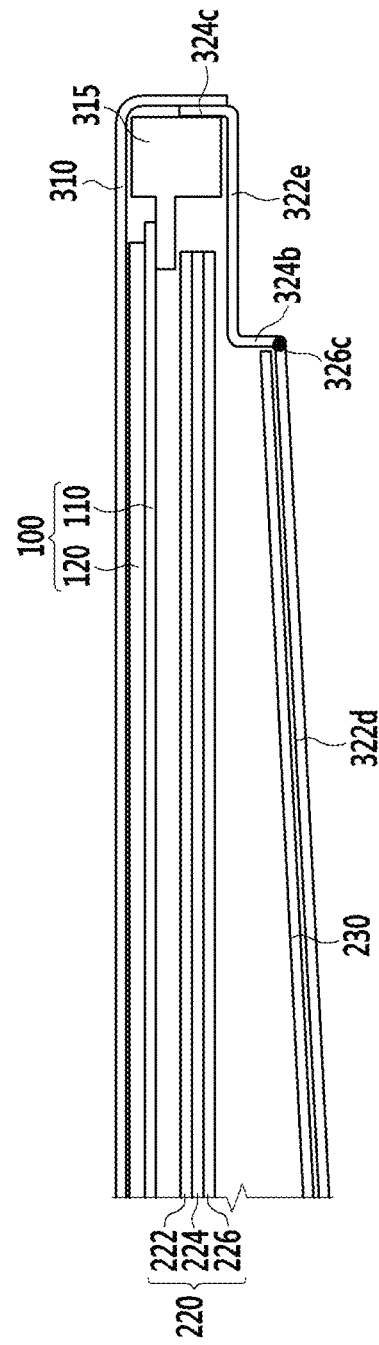
FIG. 11 is an enlarged cross-sectional view of portion B of FIG. 2.
Figure 12:
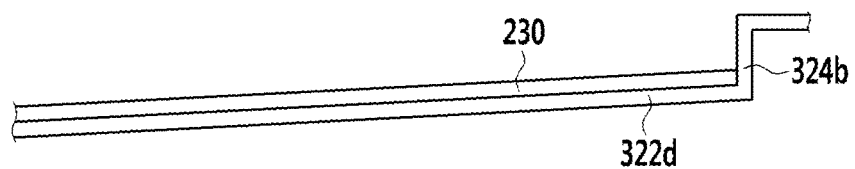
FIGS. 12 and 13 are cross-sectional views showing a lower cover and a reflector of the display device according to the first exemplary embodiment of the present invention in portion B of FIG. 2.
Figure 13:
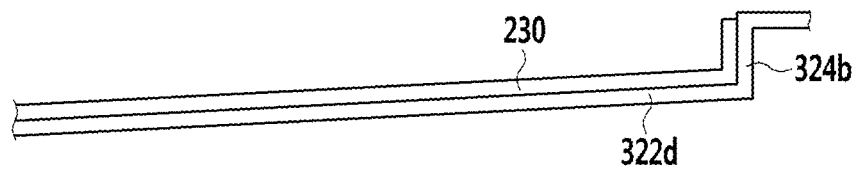

FIGS. 6 to 10 show the distribution of an amount of light emitted to an upper part of the display panel according to a position of the second bending portion in the display device according to the first exemplary embodiment of the present invention. FIG. 11 is an enlarged cross-sectional view of portion B of FIG. 2, and FIGS. 12 and 13 are cross-sectional views showing the lower cover and the reflector of the display device according to the first exemplary embodiment of the present invention in portion B of FIG. 2.

The reflector 230 bends at least once as shown in FIG. 2. The reflector 230 is formed on the second bottom surface 322c and the second inclined portion 322d of the lower cover 320.

The reflector 230 bends to correspond to the bending portion of the lower cover 320. That is, the reflector 230 has a shape in which the reflector 230 bends once on the second bending portion 326b where the second bottom surface 322c and the second inclined portion 322d of the lower cover 320 meet each other.

Referring to FIGS. 6 to 10, it can be seen that uniformity of light transmitted to the display panel 100 is varied according to the position of the second bending portion 326b.

In FIGS. 6 to 10, a lower side denotes a light-incident portion which is closest to the light source 211, and an upper side denotes a light-facing portion which is farthest from the light source 211. The light-incident portion may be a point corresponding to the first side 324a of the lower cover 320, and the light-facing portion may be a point corresponding to the second side 324b of the lower cover 320.

Figure 6:
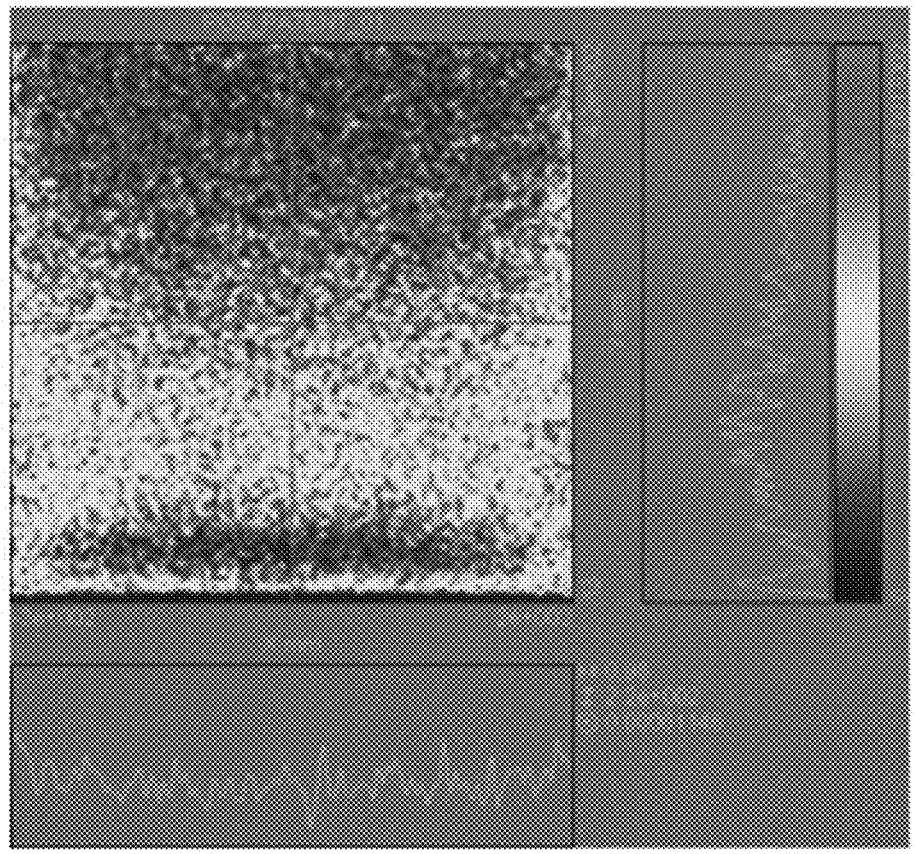
FIGS. 6, 7, 8, 9 and 10 are drawings showing the distribution of an amount of light emitted to an upper part of a display panel according to a position of a second bending portion from the display device according to the first exemplary embodiment of the present invention.
Figure 7:
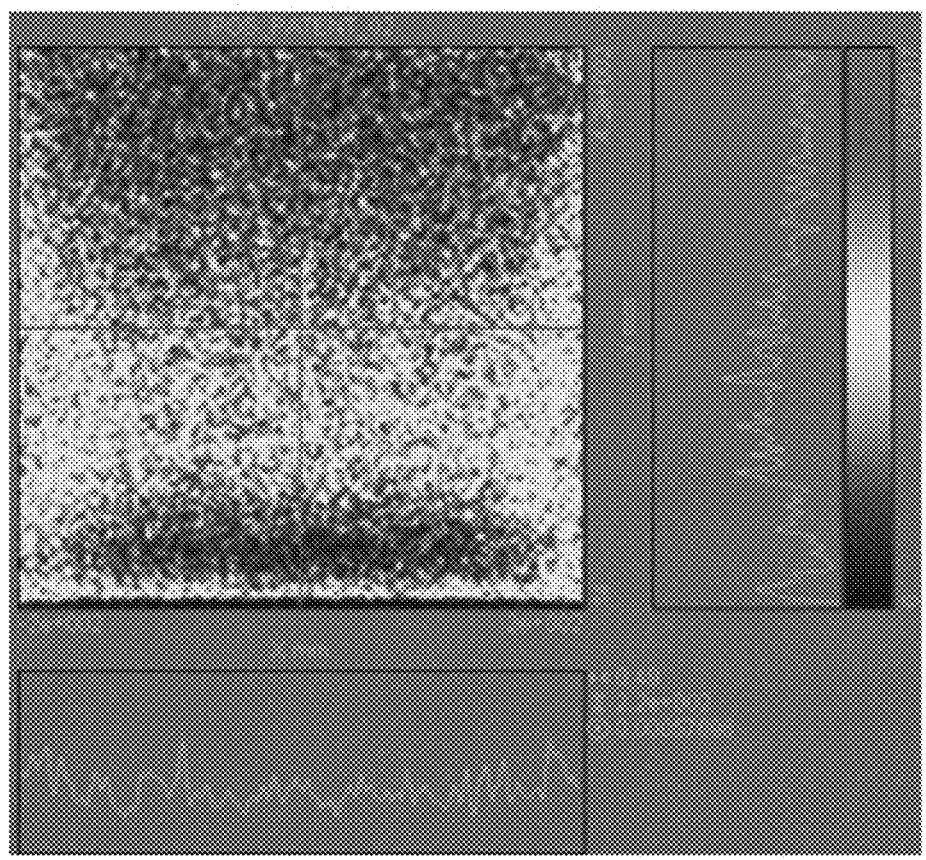

FIG. 6 shows the distribution of an amount of light from the upper part of the display panel when the length l2 from the light-incident portion to the second bending portion 326b is 0.1 times the length l1 from the light-incident portion to the light-facing portion, and FIG. 7 shows the distribution of an amount of light from the upper part of the display panel when the length l2 from the light-incident portion to the second bending portion 326b is 0.2 times the length l1 from the light-incident portion to the light-facing portion. Points which are close to the light-incident portion are brightly displayed but other points are darkly displayed as the distance from the light-incident portion increases. This is because when the second bending portion 326b is close to the light-incident portion, an angle formed between the main emission direction 600 of light and the reflector 230 is small, and thus, the reflection effect of the reflector 230 is not great, which makes it difficult for light emitted from the light source 211 to reach the light-facing portion.

Figure 8:
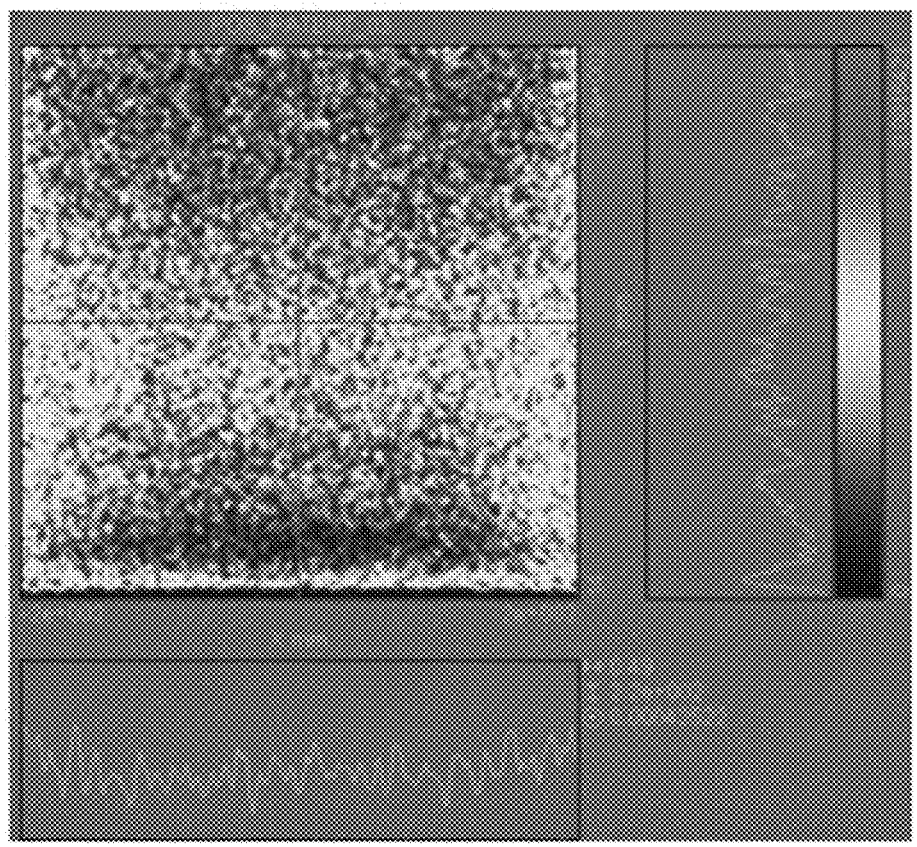
Figure 9:
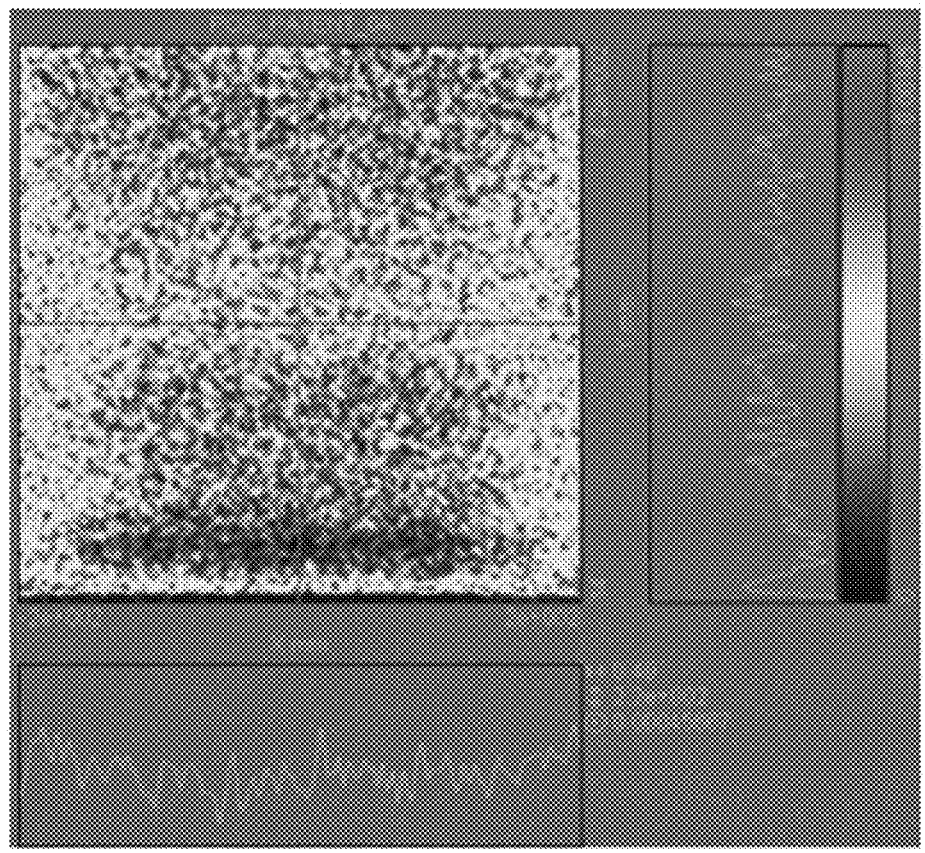

FIG. 8 shows the distribution of an amount of light from the upper part of the display panel when the length l2 from the light-incident portion to the second bending portion 326b is 0.3 times the length l1 from the light-incident portion to the light-facing portion, and FIG. 9 shows the distribution of an amount of light from the upper part of the display panel when the length l2 from the light-incident portion to the second bending portion 326b is 0.4 times the length l1 from the light-incident portion to the light-facing portion. The light is evenly distributed at all of points which are close to the light-incident portion and points which are far from the light-incident portion.

Figure 10:
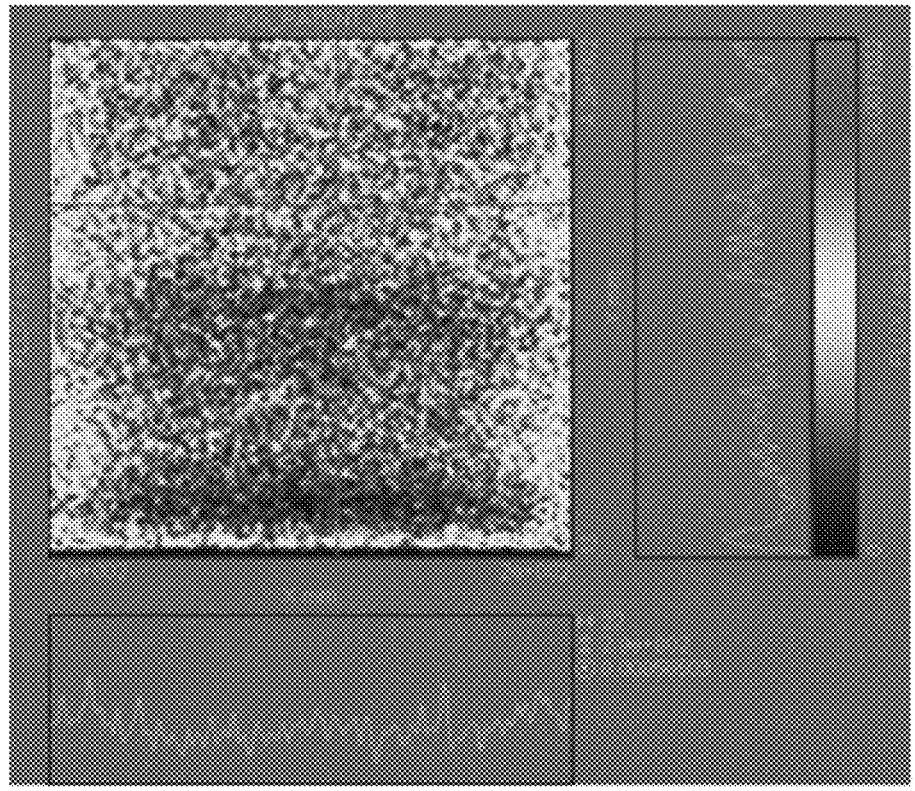

FIG. 10 shows the distribution of an amount of light from the upper part of the display panel when the length l2 from the light-incident portion to the second bending portion 326b is 0.5 times the length l1 from the light-incident portion to the light-facing portion. Points which are far from the light-incident portion are brightly displayed but points which are close to the light-incident portion are darkly displayed. This is because when the second bending portion 326b is far from the light-incident portion, the angle formed between the main emission direction 600 of light and the reflector 230 is large, and thus, the reflection effect of the reflector 230 is great, thereby increasing the amount of light that is emitted from the light source 211 and reaches the light-facing portion but relatively reducing the amount of light that is emitted to the display panel 100 from the light-incident portion.

Therefore, the position of the second bending portion 326b may be determined so that light is evenly distributed from the light-incident portion to the light-facing portion. As a result, the length l2 from the light-incident portion to the second bending portion 326b is preferably 0.2 times or more and 0.5 times or less the length l1 from the light-incident portion to the light-facing portion. Further, the length l2 from the light-incident portion to the second bending portion 326b is more preferably 0.3 times or more and 0.4 times or less the length l1 from the light-incident portion to the light-facing portion.

Referring back to FIG. 2, the reflector 230 may be formed to extend up to the first inclined portion 322b. In this case, the reflector 230 may have a shape in which the reflector 230 bends at the fourth bending portion 326d where the first inclined portion 322b and the second bottom surface of the lower cover 320 meet each other. When the light emitted from the light source 211 deviates from the main emission direction 600 to face downward, most of the light is reflected toward the display panel 100 by the second reflection portion 214b of the reflection cover 214. Therefore, the reflector 230 may not be formed up to the first inclined portion 322b. However, as the reflector 230 is formed up to the first inclined portion 322b, the reflection efficiency can be further improved.

Referring to FIGS. 11 and 12, one end of the reflector 230 may be formed to reach the third bending porting 326c where the second inclined portion 322d and the second side 324b of the lower cover 320 meet each other. At the one end of the reflector 230, a space having the same height as the second side 324b is formed between the optical sheet 220 and the reflector 230. If there is no space between the optical sheet 220 and the reflector 230, the light emitted from the light source 211 is not reflected by the reflector 230, and thus a dark portion is visible at an edge of one side of the display panel 100. In the first exemplary embodiment of the present invention, it is possible to prevent the dark portion from being visible by forming the space between the optical sheet 220 and the reflector 230.

Further, referring to FIG. 13, the reflector 230 may bend at a position corresponding to the third bending portion 326c of the lower cover 320 and extend to cover the second side 324b. As a result, the light, which is emitted from the light source 211 and reaches the second side 324b, can be reflected by the reflector 230, and thus, transmitted to the display panel 100, thereby further improving the reflection efficiency.

Next, a display device according to a second exemplary embodiment of the present invention will be described with reference to FIG. 14.

The display device according to the second exemplary embodiment of the present invention has lots of same parts as the first exemplary embodiment, so that the description of the same parts will be omitted but only different parts will be described below. The significant difference from the first exemplary embodiment is that the lower cover and the reflector are not formed, which will be described in more detail.

Figure 14:
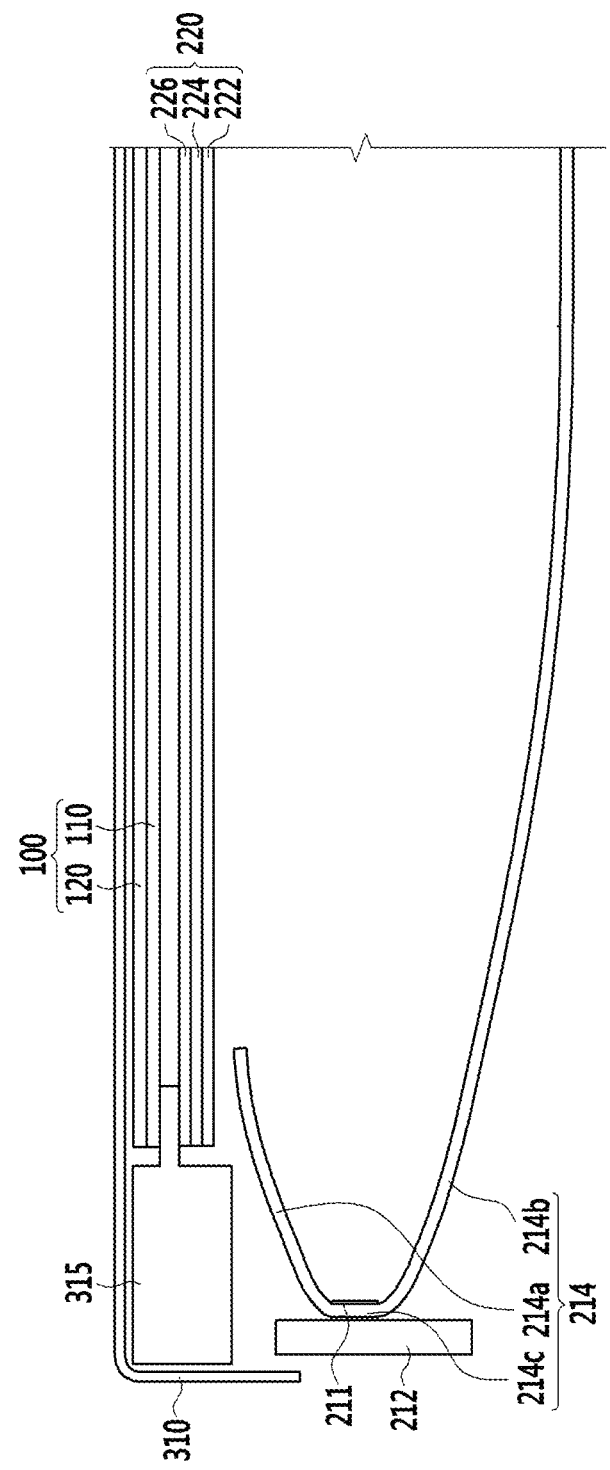
FIG. 14 is an enlarged cross-sectional view showing a portion of a display device according to a second exemplary embodiment of the present invention.

FIG. 14 is an enlarged cross-sectional view showing a portion of the display device according to the second exemplary embodiment of the present invention.

Similarly as described in the display device according to the first exemplary embodiment of the present invention, a reflector may be integrally formed with the reflection cover 214, and a second reflection portion 214b of the reflection cover 214 may extend to the second side 324b of the lower cover 320. In this case, the second reflection portion 214b may be formed from one end to the other end of the display panel 100.

Further, a lower cover may be integrally formed with the reflection cover 214. In other words, the reflection cover 214 may be formed to receive the display panel 100, the optical sheet 220, and the like.

However, in order for the reflection cover 214 to serve as a lower cover, instead of forming the reflection cover 214 with the bendable material in the above-mentioned exemplary embodiment, the reflection cover 214 may be made of a hard material capable of supporting other constituent elements.

Next, a display device according to a third exemplary embodiment of the present invention will be described with reference to FIG. 15.

The display device according to the third exemplary embodiment of the present invention has lots of same parts as the first exemplary embodiment, so that the description of the same parts will be omitted but only different parts will be described below. The significant difference from the first exemplary embodiment is that the display device includes a plurality of reflection covers and the plurality of reflection covers are symmetrically formed while facing each other, which will be described in more detail. The plurality of reflection covers may be formed in a single piece.

Figure 15:
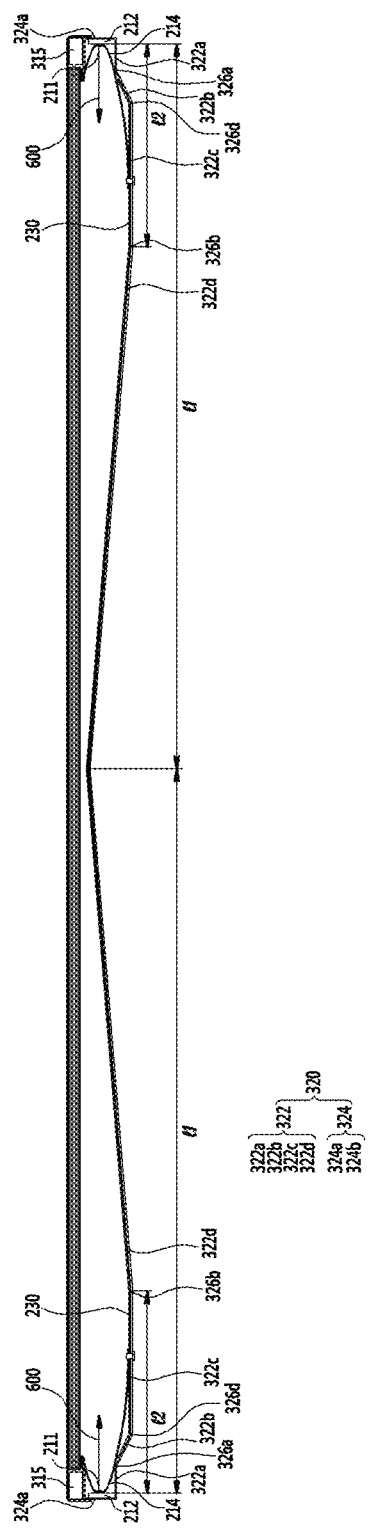
FIG. 15 is a cross-sectional view showing a display device according to a third exemplary embodiment of the present invention.
Figure 16:
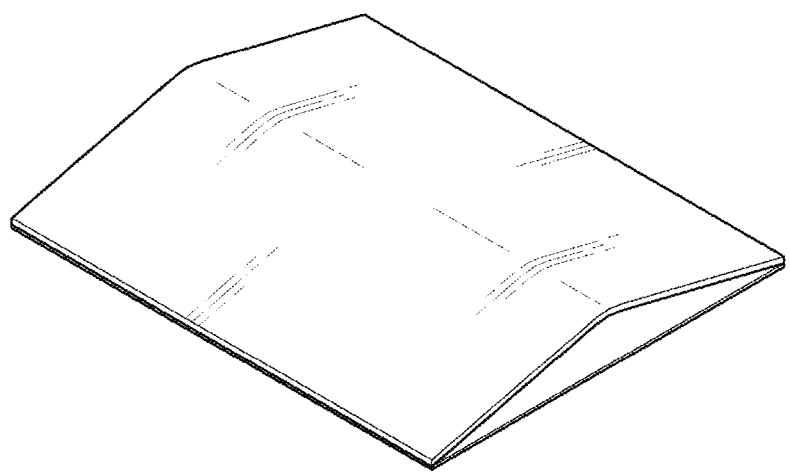
FIGS. 16 and 17 are perspective views showing a reflector of the display device according to the third exemplary embodiment of the present invention.
Figure 17:
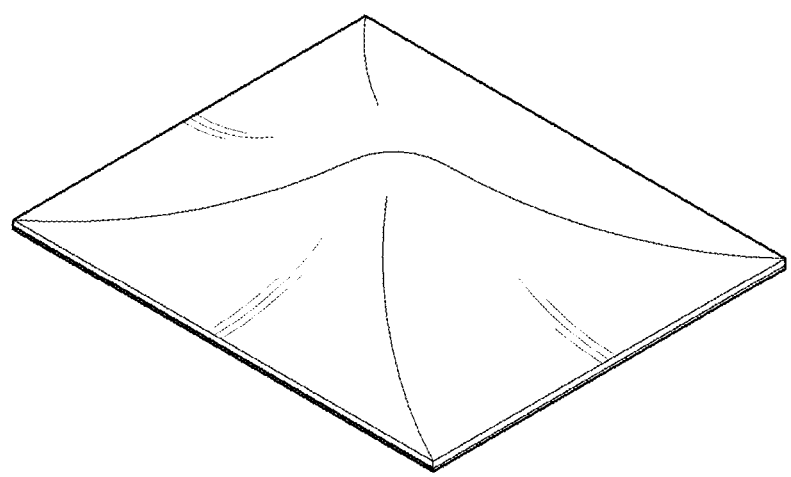

FIG. 15 is a cross-sectional view showing the display device according to the third exemplary embodiment of the present invention, and FIGS. 16 and 17 are perspective views showing a reflector of the display device according to the third exemplary embodiment of the present invention.

In the first exemplary embodiment, the light source 211 is disposed below any one side of the display panel 100, while in the third exemplary embodiment, light sources 211 may be disposed below two sides of the display panel 100. For example, the light sources 211 may be disposed below left and right sides of the display panel 100.

Further, a plurality of circuit boards 212, which are mounted with the light sources 211 disposed below the left and right sides of the display panel 100, respectively, may be formed. In this case, the circuit board 212 mounted with the light source 211 that is disposed below the left side of the display panel 100, and the circuit board 212 mounted with the light source 211 that is disposed below the right side of the display panel 100 may be symmetrically formed.

Further, a plurality of reflection covers 214 coupled to the plurality of circuit boards 212 may be formed.

A reflector 230, as shown in FIG. 16, may have a shape in which a center between the light sources 211 disposed at both sides rises high and a height decreases from the center toward both edges. In other words, the distance between the display panel 100 and the reflector 230 increases from the center toward both sides.

As described above, the light sources 211 are disposed below the both sides of the display panel 100, but the present invention is not limited thereto and the light sources 211 may be disposed below four corners of the display panel 100. In other words, the light source 211 may be disposed below left, right, upper, and lower sides of the display panel 100.

Further, the plurality of circuit boards 212 may be vertically and horizontally symmetrically formed and a plurality of reflection covers 214 coupled to the plurality of circuit boards 212 may be formed.

In this case, a reflector 230, as shown in FIG. 17, may have a shape in which the center has a maximum height and a height decreases from the center toward four edges. In other words, the distance between the display panel 100 and the reflector 230 increases from the center toward each edge.

Next, a display device according to a fourth exemplary embodiment of the present invention will be described with reference to FIGS. 18 and 19.

The display device according to the fourth exemplary embodiment of the present invention has lots of same parts as the first exemplary embodiment, so that the description of the same parts will be omitted but only different parts will be described below. The significant difference from the first exemplary embodiment is that the display device is disposed so that light emitted from a light source propagates while forming an inclined angle with a display panel, which will be described in more detail.

Figure 18:
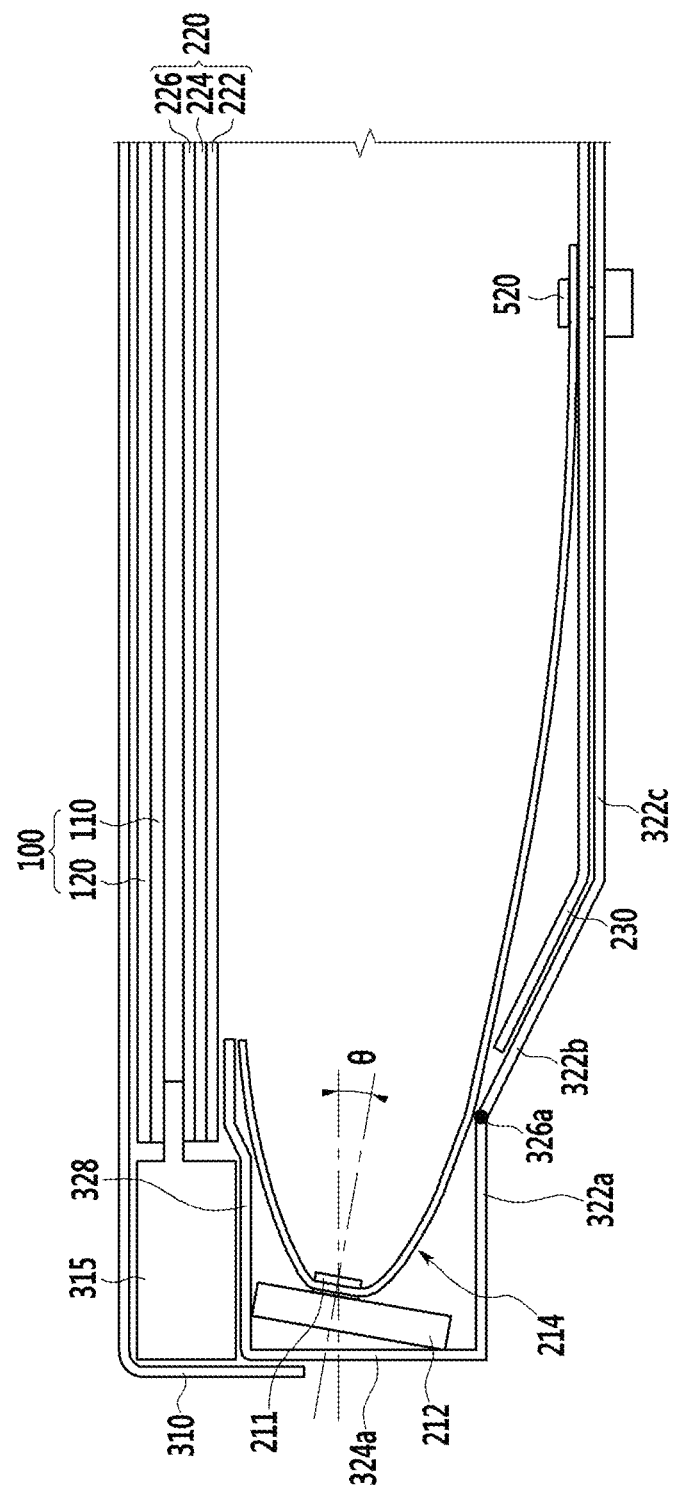
FIG. 18 is an enlarged cross-sectional view showing a portion of a display device according to a fourth exemplary embodiment of the present invention.

FIG. 18 is an enlarged cross-sectional view showing a portion of the display device according to the fourth exemplary embodiment of the present invention In the first exemplary embodiment, the light source is attached to the upper surface of the circuit board, and the circuit board is coupled to the first side of the lower cover. Therefore, the main emission direction of light is parallel with the display panel.

On the other hand, in the fourth exemplary embodiment, a light source 211 is disposed so that a main emission direction 600 of light forms an angle with the display panel 100. As shown in FIG. 18, the light source 211 is attached to an upper surface of a circuit board 212. A first side 324a of a lower cover 320 and the circuit board 212 are disposed to form an angle of more than 0 degree and 20 degrees or less.

Accordingly, an angle θ, which the main emission direction 600 of light forms with the display panel 100, becomes more than 0 degree and 20 degrees or less. Further, the angle θ is more preferably 10 degrees or more and 15 degrees or less.

Figure 19:
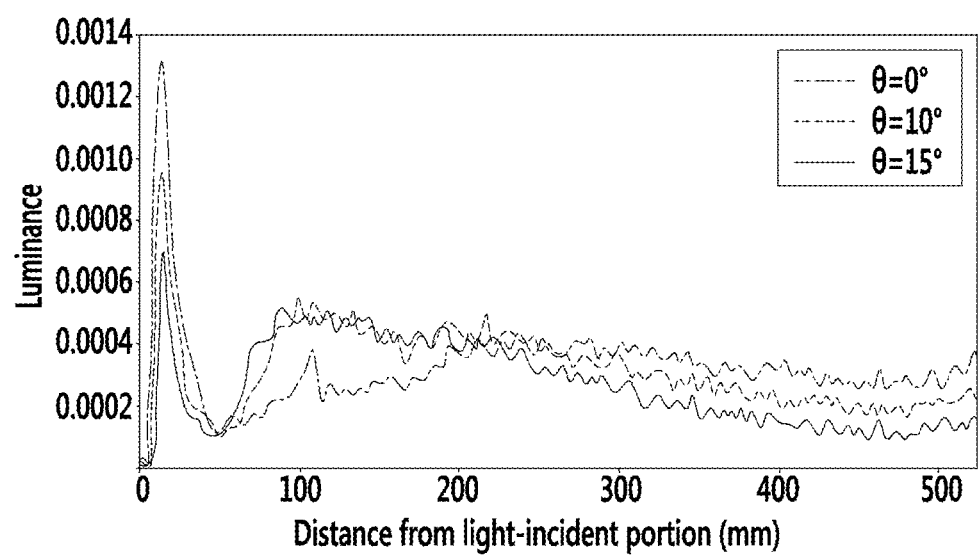
FIG. 19 is a graph showing a relationship between a distance from a light-incident portion and luminance according to an angle (θ) which a main emission direction of light forms with a display panel.

Referring to FIG. 19, it can be seen that it is possible to prevent light leakage from occurring at an edge of the display panel 100 by disposing the light source 211 so that the main emission direction 600 of light forms an angle with the display panel 100.

FIG. 19 is a graph showing a relationship between a distance from a light-incident portion and luminance according to an angle (θ) which a main emission direction of light forms with a display panel.

When the angle θ is 0 degree, that is, when the main emission direction 600 of light is parallel with the display panel 100, a portion, which is particularly brighter than other portions, is formed in the light-incident portion. Due to this, light leakage occurs at an edge of the display panel 100.

It can be seen that in the case where the angle θ, is 10 degrees, the light leakage that occurs in the light-incident portion is reduced as compared to the case where the angle θ is 0 degree.

Further, it can be confirmed that in the case where the angle θ is 15 degrees, the light leakage that occurs in the light-incident portion is further reduced.

A backlight assembly according to a fifth exemplary embodiment of the present invention and a display device including the backlight assembly will be described below with reference to the accompanying drawings.

Figure 20:
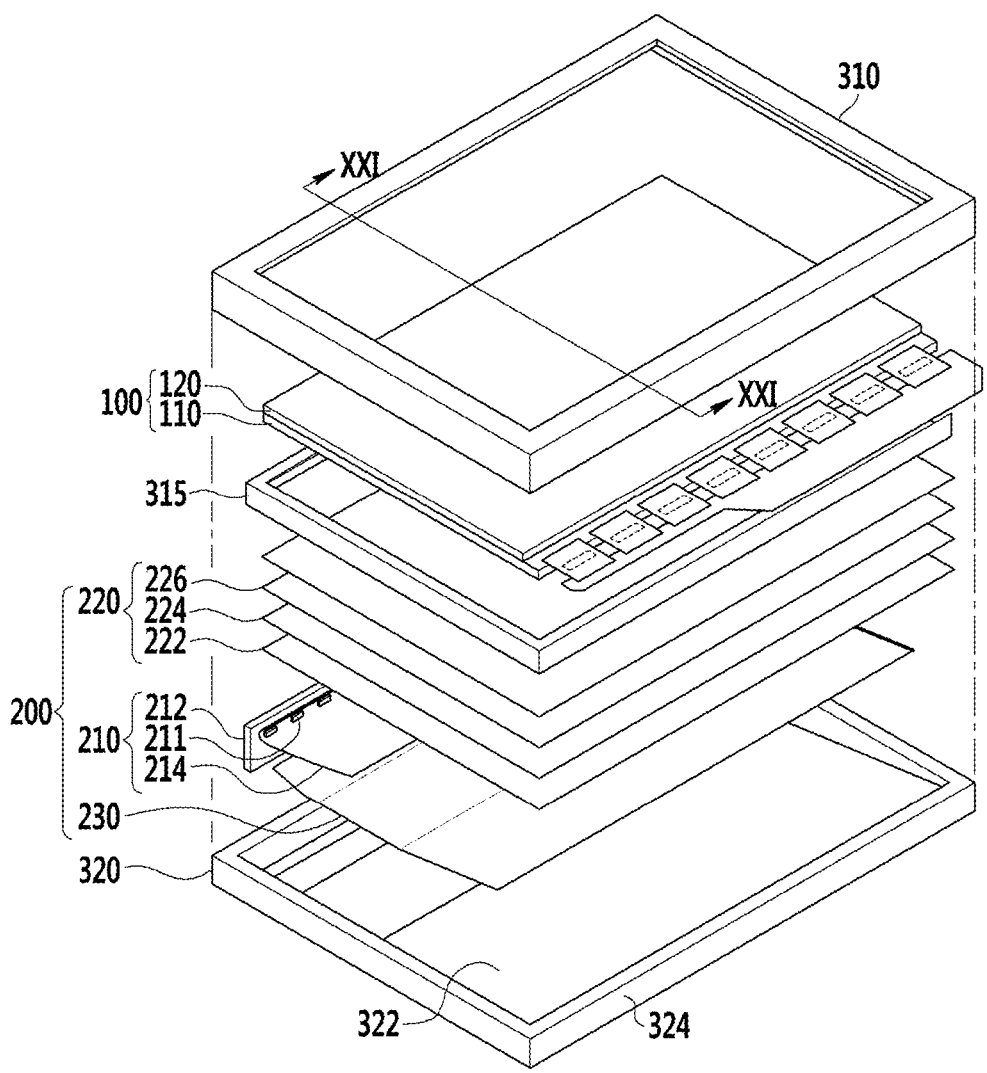
FIG. 20 is an exploded perspective view showing a display device according to a fifth exemplary embodiment of the present invention.

FIG. 20 is an exploded perspective view showing a display device according to the fifth exemplary embodiment of the present invention.

As shown in FIG. 20, the display device according to the fifth exemplary embodiment of the present invention generally includes the backlight assembly 200 supplying light and the display panel 100 receiving the light from the backlight assembly 200 to display an image. Further, in order to fix the backlight assembly 200 and the display panel 100, the upper cover 310, the mold frame 315, and the lower cover 320 are coupled to each other.

The backlight assembly 200 includes the light source unit 210 supplying light, the optical sheet 220 disposed below the display panel 100, and the reflector 230 reflecting light emitted from the light source unit 210.

The light source unit 210 is disposed below any one side of the display panel 100, and includes the light source 211 generating light, the circuit board 212 mounted with the light source 211, and the reflection cover 214 coupled to the circuit board 212.

The light source 211 may include a plurality of light emitting members, and the light emitting member may include, for example, LEDs.

The circuit board 212 is electrically connected to the light source 211 to supply a signal for driving the light source 211.

The reflection cover 214 reflects light emitted from the light source 211, and a specific shape of the reflection cover 214 will be described below with reference to FIGS. 22 to 24 in more detail.

The optical sheet 220 improves efficiency of light emitted from the light source unit 210 and allows light to be uniformly distributed throughout the display panel. The optical sheet 220 may include a plurality of various sheets and, for example, include the diffuser sheet 222, the prism sheet 224, and the protecting sheet 226 which are sequentially stacked.

The diffuser sheet 222 diffuses light emitted from the light source unit 210. The prism sheet 224 collects light diffused by the diffuser sheet 222 in a direction vertical to a plane of the display panel 100. Most of the light passing through the prism sheet 224 is vertically incident on the display panel 100. The protecting sheet 226 may be disposed on the prism sheet 224, and protects the prism sheet 224 against external impact.

As described above, the optical sheet 220 including one diffuser sheet 222, one prism sheet 224, and one protecting sheet 226 is exemplified, but the present invention is not limited thereto. The optical sheet 220 may include a plurality of sheets of at least any one of the diffuser sheet 222, the prism sheet 224, and the protecting sheet 226, and any one sheet may be omitted if necessary.

The reflector 230 is disposed on the lower cover 320. The reflector 230 changes a light path toward the display panel 100 so as to prevent the light emitted from the light source unit 210 from being lost to outside.

As the display panel 100, various display panels such as an LCD panel and an EDP may be used.

When a liquid crystal display panel is used, the liquid crystal display panel 100 is configured such that the first substrate 110 and the second substrate 120 are attached while facing each other and a liquid crystal layer (not shown) is formed between the first substrate 110 and the second substrate 120. Although not shown, on the first substrate 110, a plurality of gate lines and data lines, and a thin film transistor connected the gate lines and the data lines are formed. Further, a pixel electrode, which is applied with a signal from the data line when the thin film transistor is turned on by a signal applied from the gate line, is formed. A common electrode may be formed on the first substrate 110 or the second substrate 120, and an electric field is formed between the pixel electrode and the common electrode to control the alignment of liquid crystal molecules of the liquid crystal layer. Accordingly, the display device displays an image by controlling the light incident from the backlight assembly 200.

The upper cover 310 is formed to surround an upper edge and the side of the display panel 100 to support a front edge of the display panel 100.

The mold frame 315 is formed between the upper cover 310 and the lower cover 320 and includes the side surrounding the display panel 100 and a surface protruding from the side to receive the display panel 100. The display panel 100 is received at an upper part based on the protruding surface of the mold frame 315 and the backlight assembly 200 is formed therebelow.

The lower cover 320 includes the bottom surface 322 and sides 324 extending and bending from the bottom surface 322 in order to receive the backlight assembly 200. The display panel 100 may be provided in a rectangular shape as shown in the drawing and thus, the number of the sides 324 of the lower cover 320 may be four. The lower cover 320 may be coupled with the upper cover 310, such that the display panel 100 and the backlight assembly 200, which are positioned therein, may be fixed.

Hereinafter, some constituent elements of the display device according to the fifth exemplary embodiment of the present invention will be described in more detail.

Figure 21:
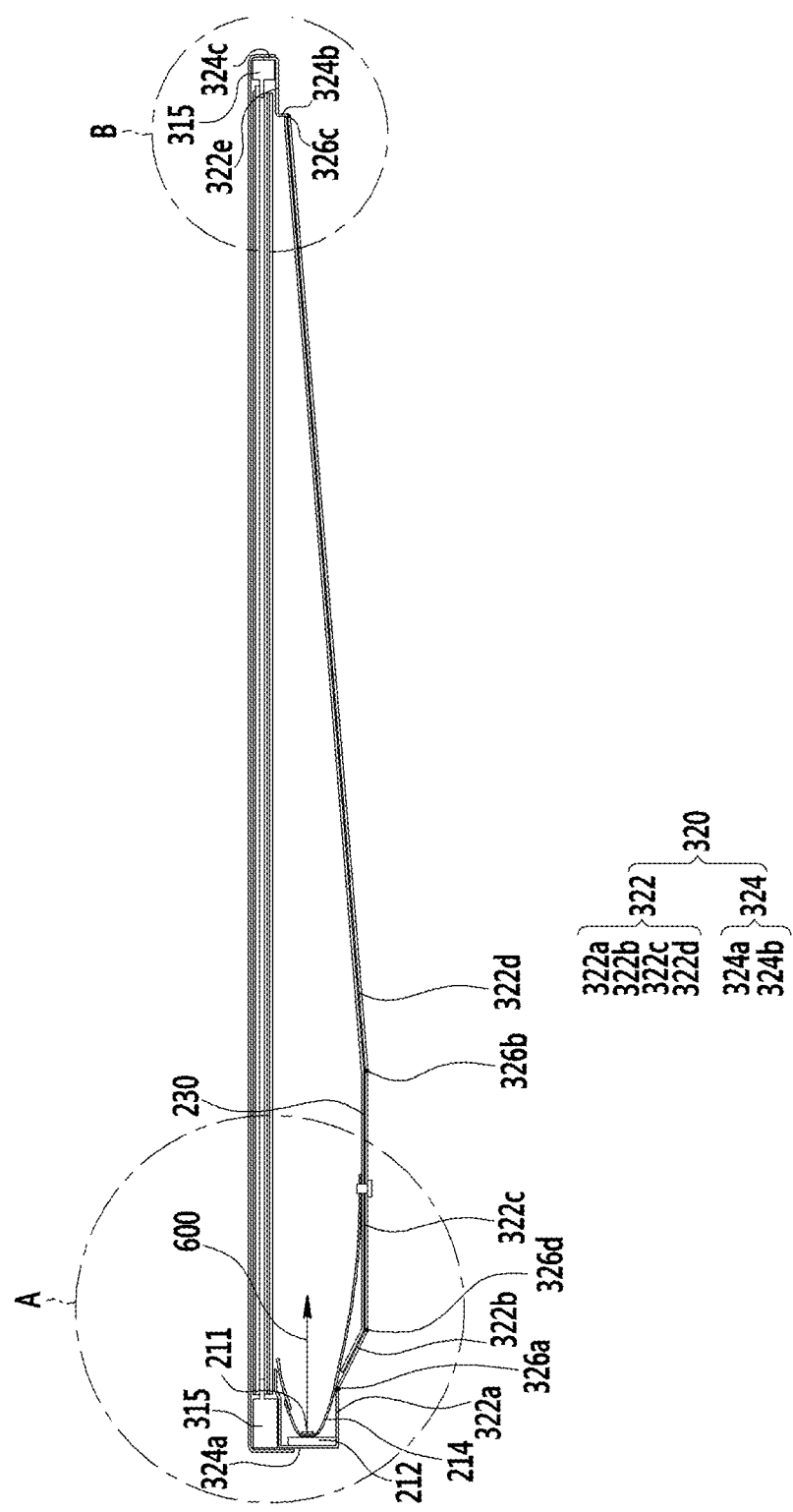
FIG. 21 is a cross-sectional view showing a display device according to a fifth exemplary embodiment of the present invention taken along line XXI-XXI of FIG. 20.

FIG. 21 is a cross-sectional view showing a display device according to the fifth exemplary embodiment of the present invention taken along line XXI-XXI of FIG. 20.

The bottom surface 322 of the lower cover 320, which is positioned at the lowest part of the display device, may be bent several times. Referring to FIG. 21, the bottom surface 322 of the lower cover 320 includes the first bottom surface 322a and the second bottom surface 322c having surfaces parallel with the display panel 100, the first inclined portion 322b connecting the first bottom surface 322a and one end of the second bottom surface 322c, and the second inclined portion 322d extending from the other end of the second bottom surface 322c.

The light source unit 210 is coupled to one of the sides 324 of the lower cover 320. The sides 324 of the lower cover 320 include the first side 324a to which the light source unit 210 is coupled, and the second side 324b which faces the first side 324a. The first side 324a of the lower cover 320 is coupled to, particularly, the circuit board 212 of the light source unit 210.

The first bottom surface 322a of the lower cover 320 is connected to the first side 324a and the second inclined portion 322d is connected to the second side 324b.

The second bottom surface 322c is formed deeper from an upper end of the first side 324a than the first bottom surface 322a. Further, the second inclined portion 322d is formed so that a depth thereof from the upper end of the first side 324a decreases as the distance from the second bottom surface 322c increases.

The lower cover 320 may further include the third bottom surface 322e connected to the second side 324b to have a surface parallel with the display panel 100 and the third side 324c extending and bending from the third bottom surface 322e. The third bottom surface 322e and the third side 324c support the mold frame 315, and may be coupled to the upper cover 310.

The circuit board 212 includes an upper surface and a lower surface. The light source 211 is mounted on the upper surface of the circuit board 212. The lower surface of the circuit board 212 is coupled to the first side 324a of the lower cover 320. Therefore, the light source 211 mainly emits light in a direction which the upper surface of the circuit board 212 faces. The direction is called the main emission direction 600 of light and is parallel with the upper surface and/or the lower surface of the display panel 100.

The lower surface of the circuit board 212 may also be formed to be coupled to the reflection cover 214, which is different from the drawing. In this case, the first side 324a of the lower cover 320 is coupled to the reflection cover 214.

In a display device in the related art, a light guide plate (LGP) is used so as to guide light emitted from the light source to the display panel 100. The fifth exemplary embodiment of the present invention has a configuration that can uniformly transmit light to the display panel 100 without using the light guide plate. The reflection cover 214 and the reflector 230 are used to accomplish this purpose and the structure of which will be described below in more detail.

First, the reflection cover will be described in more detail with reference to FIGS. 22 to 24.

Figure 22:
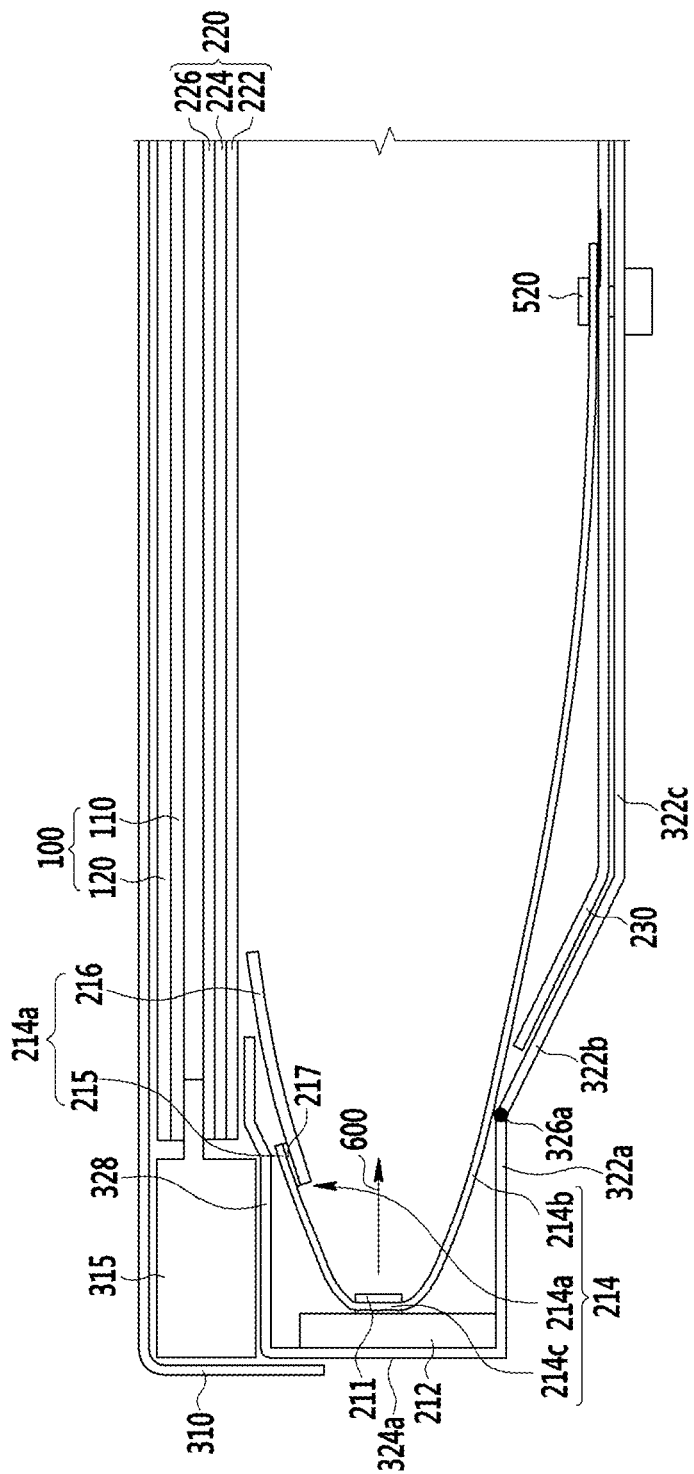
FIG. 22 is an enlarged cross-sectional view of portion A of FIG. 21.
Figure 23:
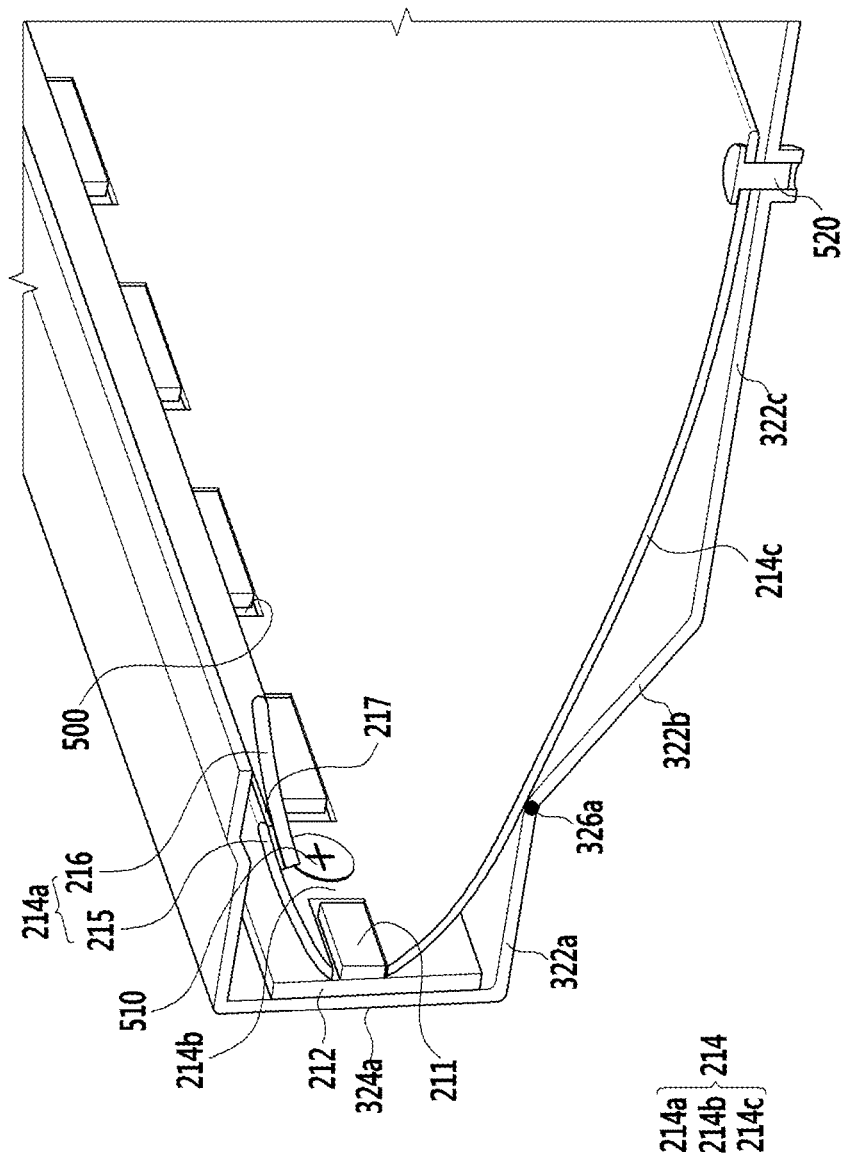
FIG. 23 is an enlarged perspective view including the same cross section as FIG. 22.
Figure 24:
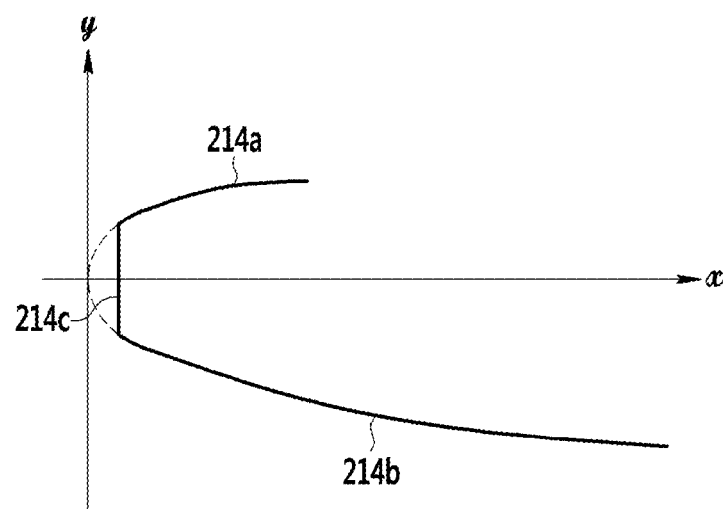
FIG. 24 is a drawing showing a shape of a reflection cover of the display device according to the fifth exemplary embodiment of the present invention with an x axis and a y axis.

FIG. 22 is an enlarged cross-sectional view of portion A of FIG. 21, FIG. 23 is an enlarged perspective view including the same cross section as FIG. 22, and FIG. 24 is a drawing showing a shape of a reflection cover of the display device according to the fifth exemplary embodiment of the present invention along an x axis and a y axis.

The reflection cover 214 includes the first reflection portion 214a formed to surround an upper side of the main emission direction 600 of light emitted from the light source 211, the second reflection portion 214b formed to surround a lower side of the main emission direction 600 of light, and the connection portion 214c connecting the first reflection portion 214a and the second reflection portion 214b.

The first reflection portion 214a has a curved surface, and curves from the connection portion 214c toward a point where the display panel 100 is positioned.

The lower cover 320 may further include the upper surface 328 that extends and bends from an upper end of the first side 324a to support a lower surface of the mold frame 315. The first reflection portion 214a is positioned below the upper surface 328 of the lower cover 320.

The first reflection portion 214a includes the reflective portion 215 made of a metal and the transflective portion 216 made of a transflective material. The transflective portion 216 is positioned at a point further away from the light source 211 than the reflective portion 215. That is, the reflective portion 215 extends from the connection portion 214c, and the transflective portion 216 is connected to the reflective portion 215. The transflective portion 216 may be formed to be thicker than the reflective portion 215.

The reflective portion 215 is made of a metal material that reflects light and includes a thick metal material manufactured using an extrusion or a bendable thin plate type member. For example, the reflective portion 215 may be made of SUS or aluminum. In order to fully reflect light, the surface on which light is received from the light source 211, that is, a light-incident surface of the reflective portion 215 may be finished to have a mirror-like surface or a specular reflection sheet may be attached to the surface thereof. Alternatively, a polymer having a reflection function may be integrated with the reflective portion 215. In this case, a material having the reflectance of 90% or more may be used or the material may be processed so that the reflectance becomes 90% or more. The light-incident surface of the reflective portion 215 may have reflectance larger than or equal to that of a surface positioned at an opposite side thereto.

The transflective portion 216 is made of a transflective material that enables a portion of light emitted from the light source 211 to pass through. For example, the transflective portion 216 may include polycarbonate (PC) or polymethyl methacrylate (PMMA). In order to fully reflect light, a surface on which light is received from the light source 211, that is, a light-incident surface of the transflective portion 216 may be mirror-like finished. Further, in order not to fully reflect light, and to further increase an amount of light passing through the transflective portion 216, the light-incident surface of the transflective portion 216 may be processed to have a rough surface.

A portion of light emitted from the light source 211 is reflected by the light-incident surface of the transflective portion 216 toward the second reflection portion 214b. Another portion thereof is totally reflected and proceeds within the transflective portion 216. When the total reflection is broken, another portion thereof comes out of the transflective portion 216. Light which is totally reflected within the transflective portion 216 mainly proceeds up to an edge of the transflective portion 216 and then is output toward the second reflection portion 214b. A remaining portion thereof leaks out through a light output surface positioned on an opposite side of the light-incident surface of the transflective portion 216.

The first reflection portion 214a may be formed to have a length so that the transflective portion 216 may overlap an edge of the display panel 100. In this case, light output from the light output surface of the transflective portion 216 may be directly incident on the display panel 100. Even though the transflective portion 216 and the display panel 100 overlap, the light output through the light output surface of the transflective portion 216 may not be directly incident on the display panel 100 in a portion where the upper surface 328 of the lower cover 320 is positioned between the transflective portion 216 and the display panel 100. Accordingly, the upper surface 328 of the lower cover 320 may not be formed in at least a partial area of a portion where the transflective portion 216 and the display panel 100 overlap.

The display panel 100 includes a display area for displaying a screen and a non-display area surrounding the display area, and the transflective portion 216 may be formed so as to overlap the non-display area of the display panel 100. This is because the transflective portion 216 may be visible on the screen when the transflective portion 216 overlaps the display area of the display panel 100.

Further, the transflective portion 216 may be formed so as not to overlap the display panel 100.

The transflective portion 216 directly supplies only a portion of light emitted from the light source 211 to the display panel 100, and returns the remaining light into an inside of the backlight assembly 200. Accordingly, neither light leakage nor the dark portion occurs at the edge of the display panel 100. It is also possible to increase light efficiency of the backlight assembly 200.

In this case, in order to adjust transmittance of the transflective portion 216 to prevent the light leakage and the dark portion from occurring at the edge of the display panel 100, the aforementioned mirror-like finishing or roughness processing may be used. When the transmittance of the transflective portion 216 is appropriate, mirror-like finishing and roughness processing may not be performed.

The reflective portion 215 and the transflective portion 216 may partially overlap. An adhesive member 217 may be further formed between the reflective portion 215 and the transflective portion 216 to attach the reflective portion 215 and the transflective portion 216 in a portion where the reflective portion 215 and the transflective portion 216 overlap. The adhesive member 217 may include a double-sided adhesive tape.

The second reflection portion 214b is formed of a curved surface and curves from the connection portion 214c to reach the bottom surface 322 of the lower cover 320.

The first bending portion 326a is formed at a point where the first bottom surface 322a and the first inclined portion 322b of the lower cover 320 meet each other, and supports the second reflection portion 214b to maintain a shape of the second reflection portion 214b.

The second reflection portion 214b comes in contact with the reflector 230 and may be coupled to the reflector 230. For example, the second fastening member 520, which penetrates the second reflection portion 214b and the reflector 230 to couple the reflection cover 214 and the reflector 230, may be formed. Further, the second fastening member 520 penetrates the lower cover 320, such that the reflection cover 214 is also coupled to the lower cover 320. The drawing shows an example that the second fastening member 520 is a screw, but the present invention is not limited thereto and the reflection cover 214 and the lower cover 320 may be coupled to each other by a double-sided adhesive tape or the like.

The connection portion 214c may be coupled to a front surface of the circuit board 212. A first fastening member 510, which penetrates the connection portion 214c and the circuit board 212 to couple the reflection cover 214 and the circuit board 212, may be formed. The drawing shows an example that the first fastening member 510 is a screw, but the present invention is not limited thereto and the reflection cover 214 and the circuit board 212 may be coupled by a double-sided adhesive tape or the like.

A heat radiation member (not shown) may be further formed between the connection portion 214c of the reflection cover 214 and the circuit board 212. As the heat radiation member, for example, a heat radiating tape may be used. Therefore, the reflection cover 214 serves as a heat radiation fin of the circuit board 212, thereby increasing heat radiating efficiency of the light source 211.

The connection portion 214c further includes the opening 500 which is formed to correspond to a position where the light source 211 is mounted. The opening 500 has a size equal to or larger than that of the light source 211. The light source 211 is exposed through the opening 500, and light is emitted to the main emission direction 600 of light from the light source 211. The light source 211 may include the plurality of light emitting members and the opening 500 is formed correspondingly to the number of light emitting members.

As described above, the connection portion 214c is coupled to the front surface of the circuit board 212, but the present invention is not limited thereto and the connection portion 214c may be coupled to a rear surface of the circuit board 212. That is, the rear surface of the circuit board 212 may be coupled to the connection portion 214c of the reflection cover 214, and the connection portion 214c may be coupled to the lower cover 320.

Referring to FIG. 24, it can be seen that the first reflection portion 214a and the second reflection portion 214b form a single parabola. A parabolic equation may be represented by the aforementioned Equation 1.

As described above, the first reflection portion 214a and the second reflection portion 214b are formed of the curved surface, but the present invention is not limited thereto. The first reflection portion 214a and the second reflection portion 214b may also be formed to be positioned on a straight light in a cross sectional view.

A length of the second reflection portion 214b is longer than that of the first reflection portion 214a. The first reflection portion 214a may be formed to have a length so as not to overlap the display panel 100, or to overlap an edge of the display panel 100, particularly, a non-display area of the display panel 100. The second reflection portion 214b may be formed to have an optimal length so that the second reflection portion 214b is longer than the first reflection portion 214a and reflects the light emitted from the light source 211 when the light deviates from the main emission direction 600 of light to supply the light to the display panel 100.

In the fifth exemplary embodiment of the present invention, the second reflection portion 214b is formed from the connection portion 214c up to a position where the second fastening member 520 is formed and the second reflection portion 214b of the reflection cover 214 overlaps the reflector 230.

The reflector 230 bends at least once. The reflector 230 is formed on the second bottom surface 322c and the second inclined portion 322d of the lower cover 320.

The reflector 230 bends to correspond to the bending portion of the lower cover 320. That is, the reflector 230 has a shape in which the reflector 230 bends once on the second bending portion 326b where the second bottom surface 322c and the second inclined portion 322d of the lower cover 320 meet each other.

Hereinafter, a principle that prevents light leakage and a dark portion from occurring at an edge of a display panel in the display device according to the fifth exemplary embodiment of the present invention will be described.

Figure 25:
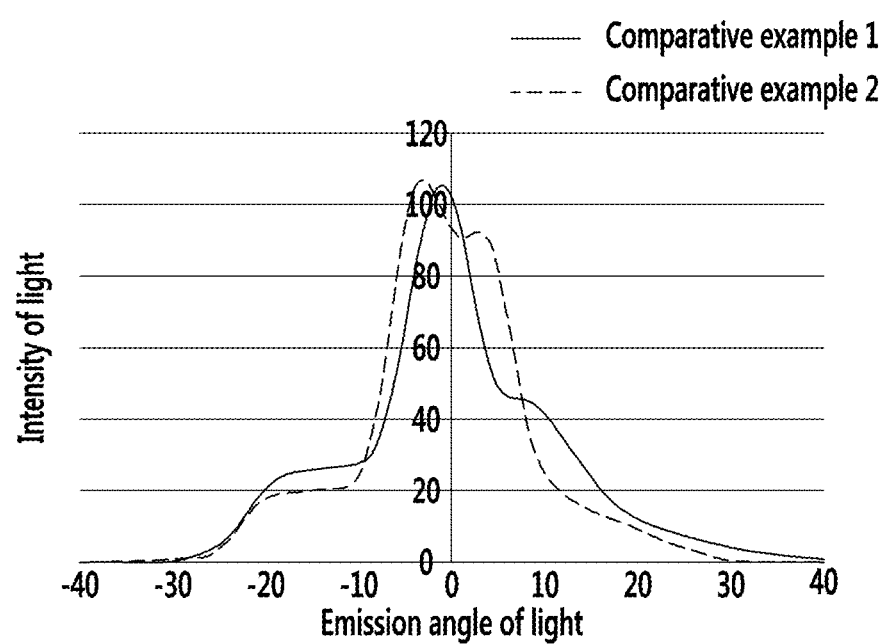
FIG. 25 is a graph showing intensity of light based on an emission angle of light emitted from a light source in a display device according to comparative examples.

FIG. 25 is a graph showing intensity of light based on an emission angle of light emitted from a light source in a display device according to comparative examples. In FIG. 25, 0 degrees indicates a direction parallel with the display panel, a positive angle indicates an angle toward the display panel, and a negative angle indicates an angle toward the bottom surface of the lower cover 320.

Comparative example 1 shows a case where the first reflection portion 214a of the reflection cover 214 is formed so as not to overlap the display panel 100 in the display device according to the fifth exemplary embodiment of the present invention. That is, comparative example 1 shows a case where the first reflection portion 214a is formed to be shorter than in the fifth exemplary embodiment.

Comparative example 2 shows a case where the reflection cover 214 is entirely made of a metal material in the display device according to the fifth exemplary embodiment of the present invention. That is, comparative example 2 shows a case where light incident on the first reflection portion 214a of the reflection cover 214 is not penetrated.

It can be seen that most of light is distributed between −10 degrees and 10 degrees in both of comparative example 1 and comparative example 2. Light emitted from the light source 211 generally travels in all directions, but the reflection cover 214 is formed to surround the upper side and the lower side of the light source 211, thereby increasing straightness of light.

In comparative example 1, significantly large amount of light is shown at a point of +10 degrees rather than a point of −10 degrees. The point of +10 degrees is a point where the first reflection portion 214a of the reflection cover 214 is not formed and thus, light emitted from the light source 211 is directly incident on the display panel 100 and is visible as light leakage.

In comparative example 2, the first reflection portion 214a of the reflection cover 214 is longer than the comparative example 1 in order to prevent the light leakage of comparative example 1. In comparative example 2, an amount of light at the point of +10 degrees significantly decreases as compared to comparative example 1 and thus, the point of +10 degrees is visible as a dark portion. The reflection cover 214 is entirely made of a metal material and thus, light does not pass through the first reflection portion 214a.

In the fifth exemplary embodiment of the present invention, by forming the length of the first reflection portion 214a to be the same as in comparative example 2, and making the first reflection portion 214a of a transflective material, it is possible to show an intermediate characteristic between comparative example 1 and comparative example 2. That is, by enabling only a portion of light incident on the first reflection portion 214a to be directly incident on the display panel 100, neither light leakage nor the dark portion may be visible. In order to prevent the light leakage and the dark portion, there is a need to adjust transmittance of the first reflection portion 214a. Through material selection, thickness adjustment, and surface processing of the first reflection portion 214a, it is possible to adjust the transmittance.

Next, a display device according to a sixth exemplary embodiment of the present invention will be described below with reference to FIG. 26.

The display device according to the sixth exemplary embodiment of the present invention has lots of same parts as the fifth exemplary embodiment, so that the description of the same parts will be omitted but only different parts will be described below. The sixth exemplary embodiment has a reflective portion 215 and the transflective portion 216, which will be described in more detail.

Figure 26:
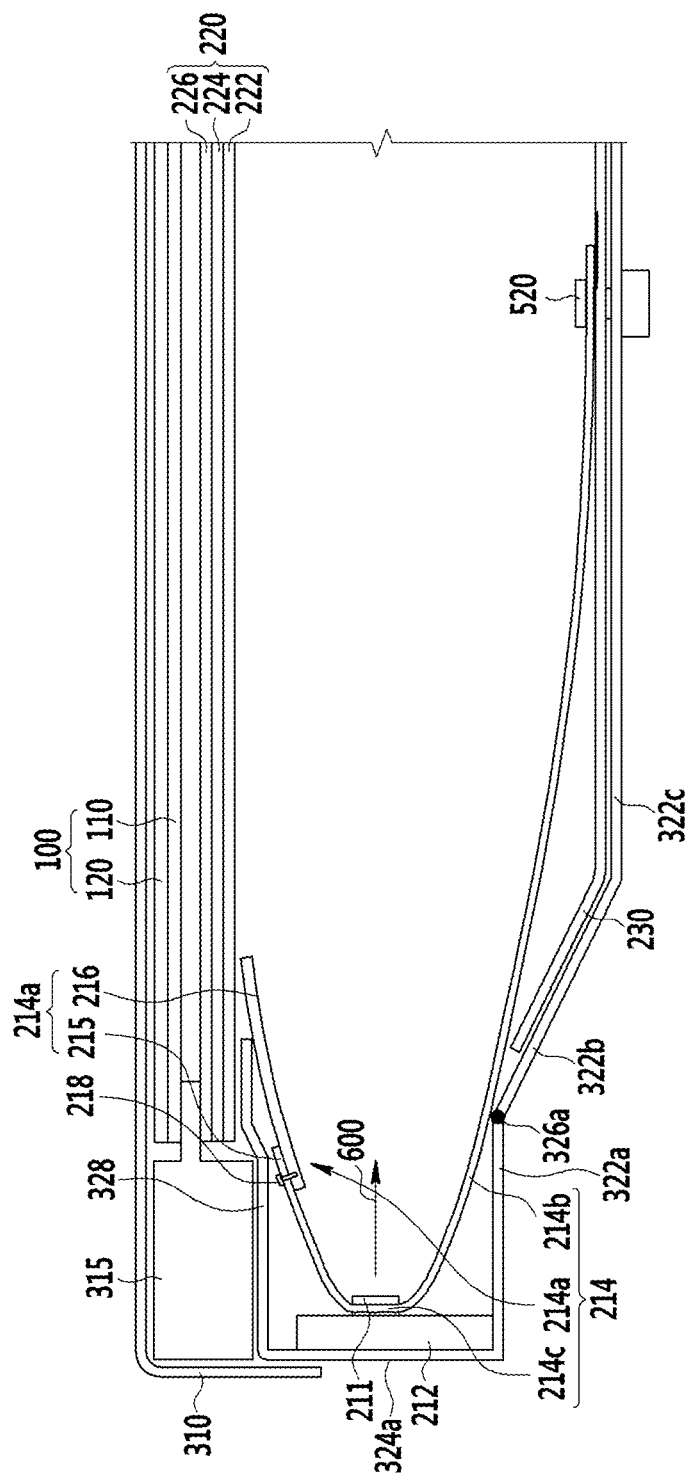
FIG. 26 is an enlarged cross-sectional view showing a portion of a display device according to a sixth exemplary embodiment of the present invention.

FIG. 26 is an enlarged cross-sectional view showing a portion of a display device according to the sixth exemplary embodiment of the present invention.

The reflection cover 214 of the display device according to the sixth exemplary embodiment of the present invention includes the first reflection portion 214a, the second reflection portion 214b, and the connection portion 214c.

The first reflection portion 214a includes the reflective portion 215 made of a reflection material such as metal and the transflective portion 216 made of a material having controllable transmittance such as transflective material.

The reflective portion 215 and the transflective portion 216 may partially overlap. A third fastening member 218 connecting the reflective portion 215 and the transflective portion 216 may be further formed in a portion where the reflective portion 215 and the transflective portion 216 overlap. A hole passing through the reflective portion 215 and the transflective portion 216 may be formed in the portion where the reflective portion 215 and the transflective portion 216 overlap. A screw thread may be formed within the hole. The third fastening member 218 may be formed of a male screw to thereby be inserted into the hole. When a screw head of the third fastening member 218 is positioned on the light-incident surface of the reflection cover 214, it may affect a reflection characteristic of the reflection cover 214. Therefore, the screw head of the third fastening member 218 may be positioned on an opposite surface of the light-incident surface of the reflection cover 214. A double-sided adhesive tape or the like can be used as a third fastening member.

In the portion where the reflective portion 215 and the transflective portion 216 overlap, the reflective portion 215 may be positioned on the light-incident surface of the reflection cover 214. On the contrary, the transflective portion 216 may be positioned on the light-incident surface of the reflection cover 214.

Next, a display device according to a seventh exemplary embodiment of the present invention will be described with reference to FIGS. 27 to 29.

The display device according to the seventh exemplary embodiment of the present invention has lots of same parts as the fifth exemplary embodiment, so that the description of the same parts will be omitted but only different parts will be described below. The significant difference from the fifth exemplary embodiment is that the entire first reflection portion 214a of the reflection cover 214 is made of transflective material, which will be described in more detail.

Figure 27:
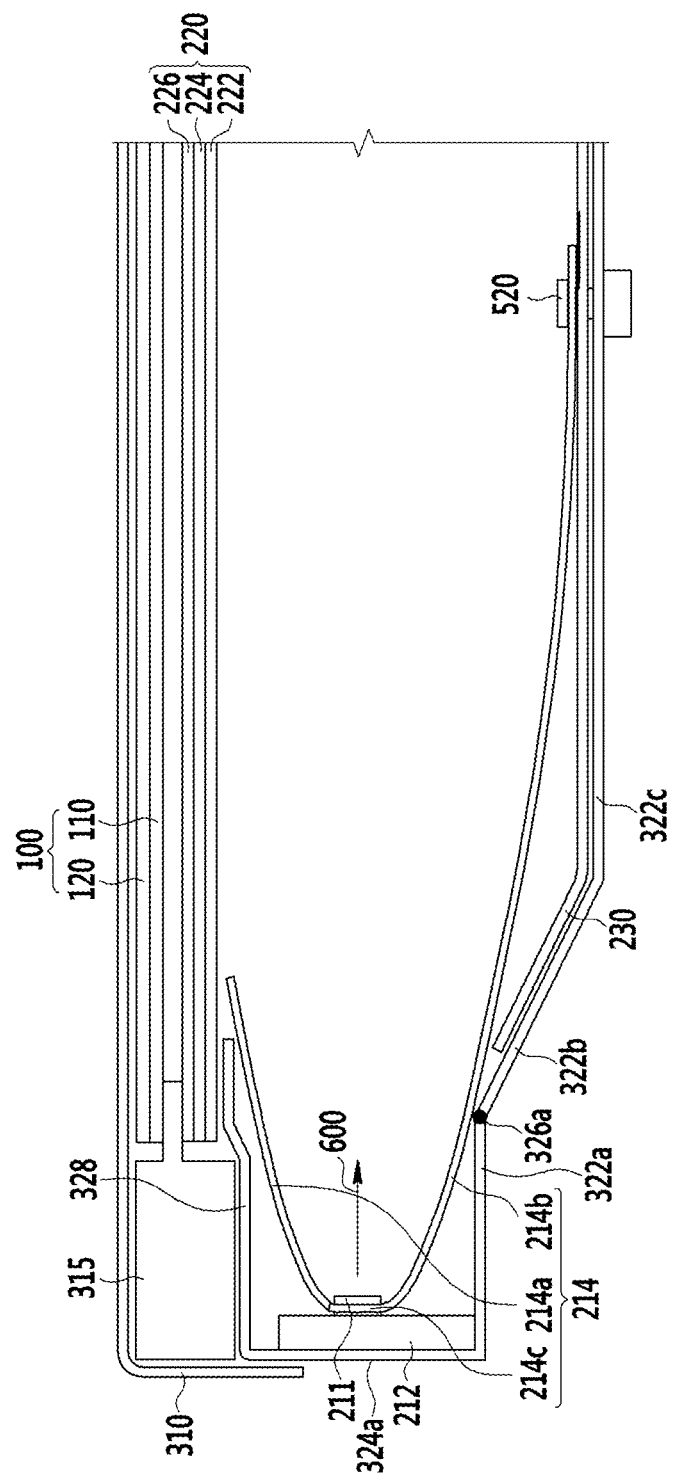
FIG. 27 is an enlarged cross-sectional view showing a portion of a display device according to a seventh exemplary embodiment of the present invention.
Figure 28:
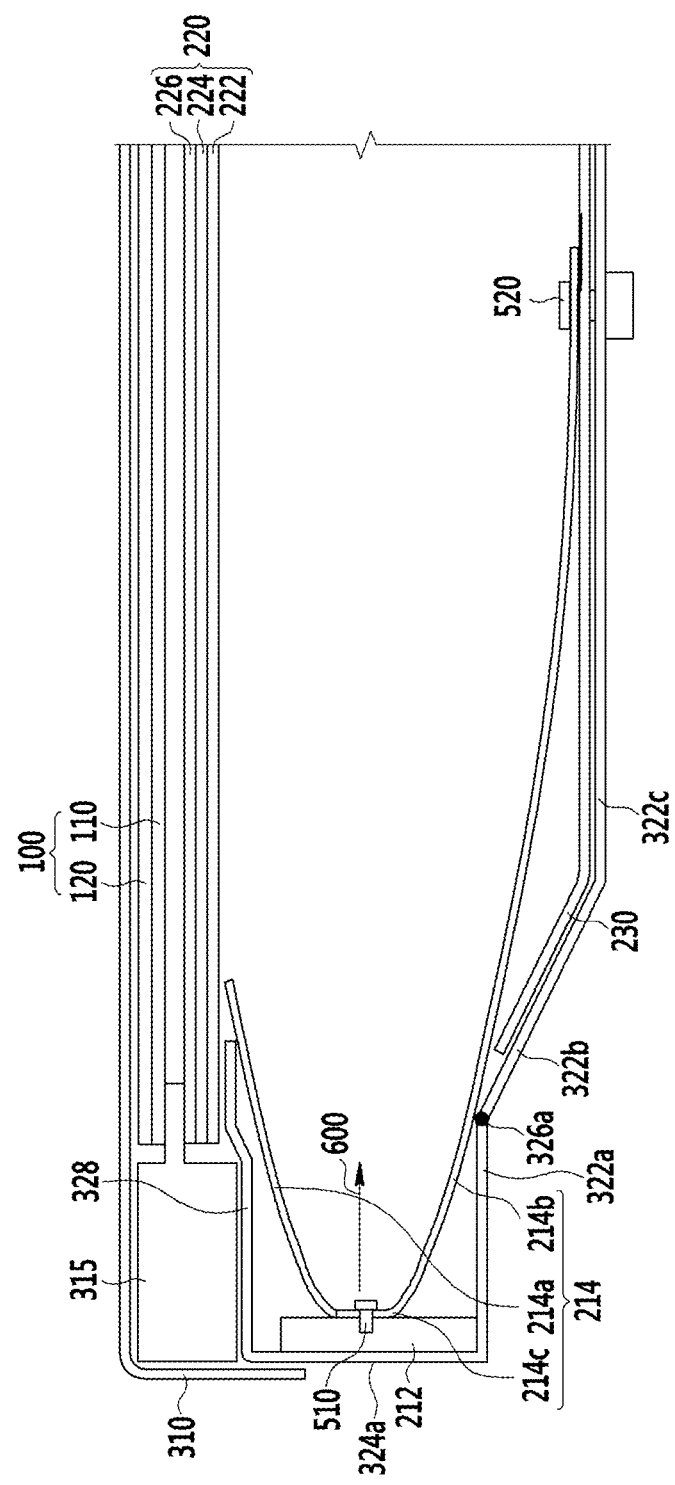
FIG. 28 is an enlarged cross-sectional view showing a portion of the display device according to the seventh exemplary embodiment of the present invention.
Figure 29:
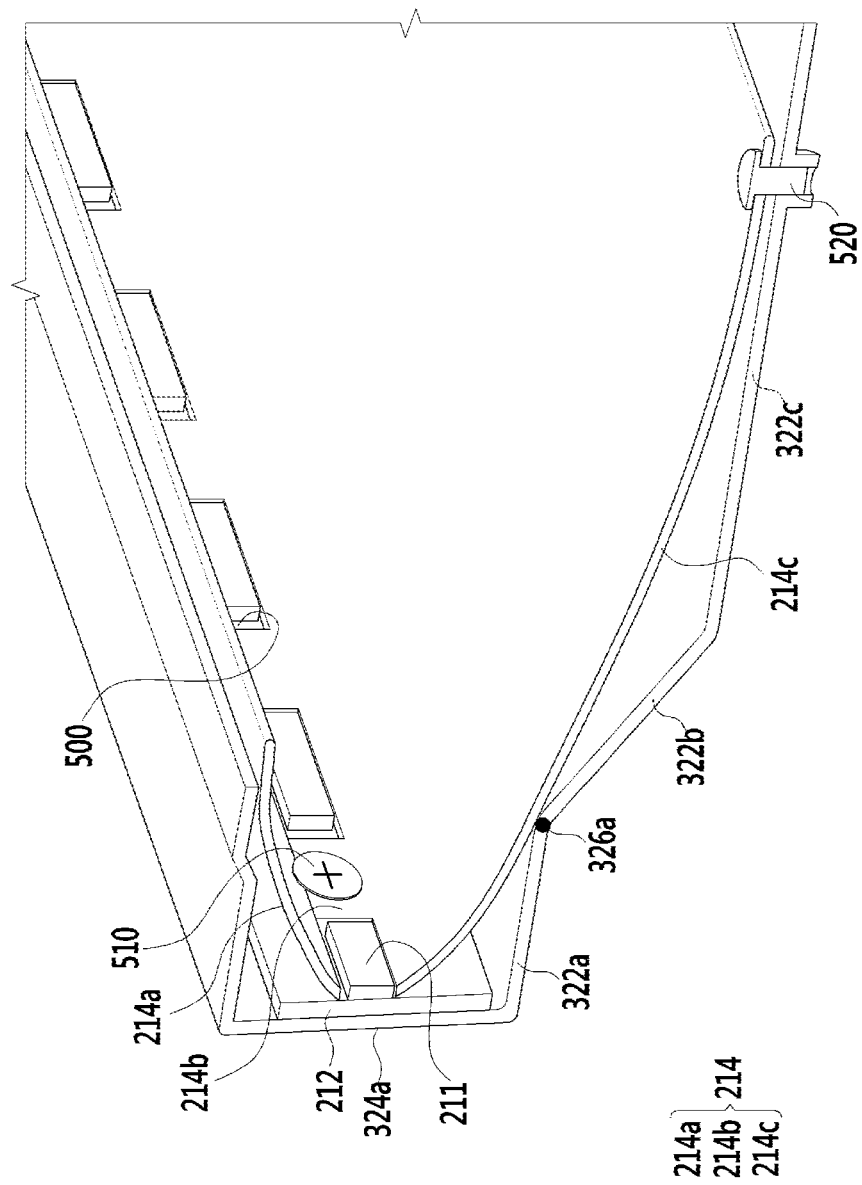
FIG. 29 is an enlarged perspective view including the same cross section as FIG. 27.

FIG. 27 is an enlarged cross-sectional view showing a portion of a display device according to the seventh exemplary embodiment of the present invention, FIG. 28 is an enlarged cross-sectional view showing a portion of the display device according to the seventh exemplary embodiment of the present invention, and FIG. 29 is an enlarged perspective view including the same cross section as FIG. 27.

The reflection cover 214 of the display device according to the seventh exemplary embodiment of the present invention includes the first reflection portion 214a, the second reflection portion 214b, and the connection portion 214c.

The first reflection portion 214a curves from the connection portion 214c to reach a point where the display panel 100 is positioned, and may be provided in a curved shape. The first reflection portion 214a may be formed to be thicker than the connection portion 214c. The first reflection portion 214a is entirely made of a transflective material. For example, the first reflection portion 214a may include PC or PMMA.

In order to control the amount of light passing through the first reflection portion 214a, the light-incident surface of the first reflection portion 214a may have a transflective portion. The light-incident surface of the first reflection portion 214a may be treated to have a rough surface for transmittance of light. Further, a partial area of the first reflection portion 214a may be mirror-like finished and a remaining partial area may be treated to have a rough surface for transmittance of light. For example, an area of the first reflection portion 214a close to the light source 211 may be mirror-like finished and an area thereof close to the display panel 100 may be treated to have a rough surface for transmittance of light.

The first reflection portion 214a may be formed to have a length so as not to overlap the display panel 100 or so as to overlap the non-display area of the display panel 100. In this case, light transmitted through the transflective portion of the first reflection portion 214a may be directly incident on the display panel 100. Even though the first reflection portion 214a and the display panel 100 overlap, light transmitted through the transflective portion of the first reflection portion 214a may not be directly incident on the display panel 100 in a portion where the upper surface 328 of the lower cover 320 is positioned between the first reflection portion 214a and the display panel 100. Accordingly, the upper surface 328 of the lower cover 320 may not be formed in at least a partial area of a portion where the first reflection portion 214a and the display panel 100 overlap.

An adhesive member may be formed between the first reflection portion 214a and the connection portion 214c. The first reflection portion 214a and the connection portion 214c may be fixed by the adhesive member, for example, a double-sided adhesive tape, a screw or the like.

The connection portion 214c may be fixed on the circuit board 212 by the first fastening member 510. Further, the present invention is not limited thereto. The connection portion 214c may be fixed on the circuit board 212 by the double-sided adhesive tape.

The first reflection portion 214a and the connection portion 214c may be directly fixed on the circuit board by the adhesive member, for example, a double-sided adhesive tape, a screw or the like without using the adhesive member between the first reflection portion 214a and the connection portion 214c.

Next, a display device according to an eighth exemplary embodiment of the present invention will be described with reference to FIG. 30.

The display device according to the eighth exemplary embodiment of the present invention has lots of same parts as the seventh exemplary embodiment, so that the description of the same parts will be omitted but only different parts will be described below. The significant difference from the seventh exemplary embodiment is that the reflection sheet 219 is further formed on the first reflection portion 214a of the reflection cover 214, which will be described in more detail.

Figure 30:
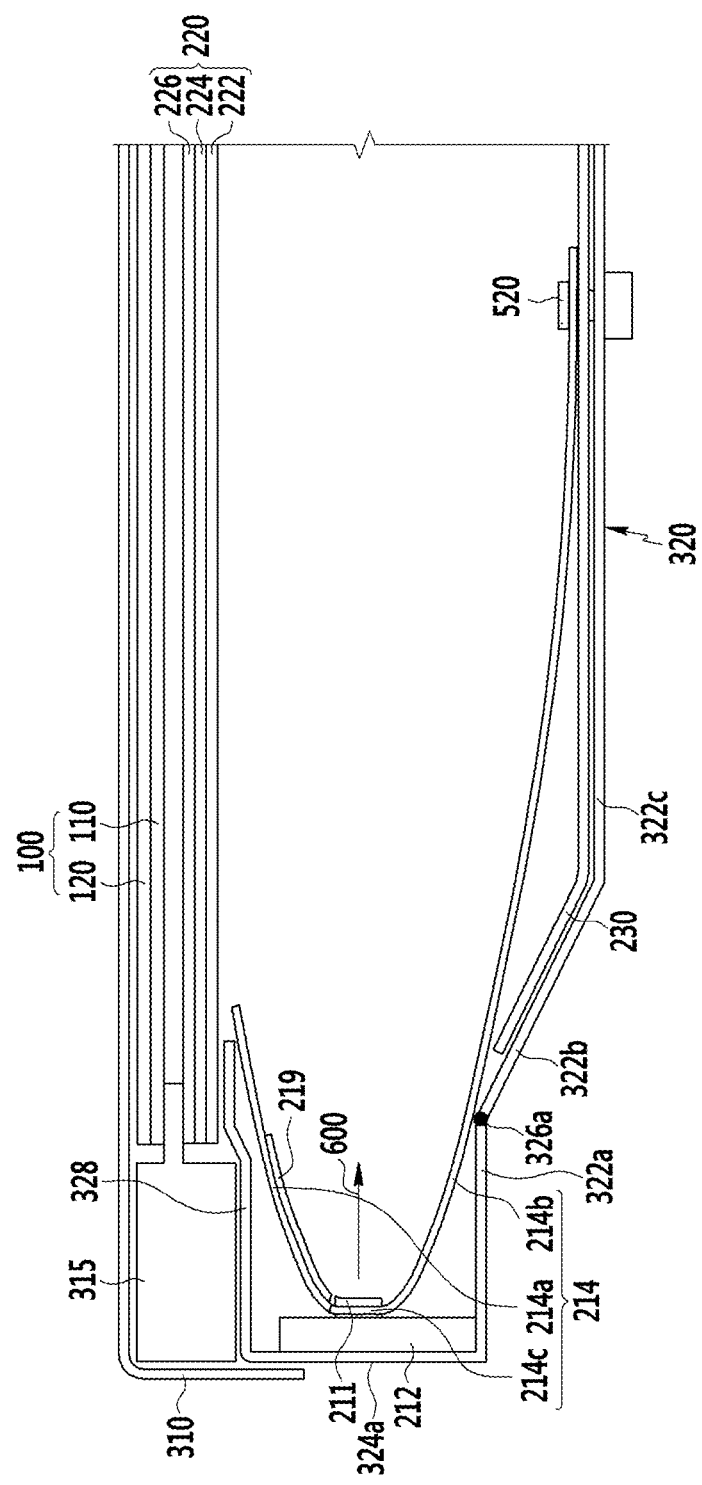
FIG. 30 is an enlarged cross-sectional view showing a portion of a display device according to an eighth exemplary embodiment of the present invention.

FIG. 30 is an enlarged cross-sectional view showing a portion of the display device according to the eighth exemplary embodiment of the present invention.

The reflection cover 214 of the display device according to the eighth exemplary embodiment of the present invention includes the first reflection portion 214a, the second reflection portion 214b, and the connection portion 214c.

The first reflection portion 214a is entirely made of a transflective material, and the reflection sheet 219 is further formed on the first reflection portion 214a. The reflection sheet 219 is made of a reflective material, and may be attached on a partial area of the first reflection portion 214a. Particularly, the reflection sheet 219 may be attached to be positioned in an area adjacent to the light source 211. For example, the reflection sheet 219 may be attached to about a half of the entire area of the first reflection portion 214a, close to the light source 211. As another example, the reflection sheet 219 may be attached to an area overlapping the upper surface 328 of the lower cover 320 in the entire area of the first reflection portion 214a. In a portion where the reflection sheet 219 is attached, light barely passes through the first reflection portion 214a.

As described above, the first reflection portion 214a is entirely made of a transflective material and the reflection sheet 219 is attached on the first reflection portion 214a, but the present invention is not limited thereto. Even when the first reflection portion 214a includes a reflective portion and a transflective portion as in the first and the sixth exemplary embodiments, the reflection sheet 219 may be attached on the first reflection portion 214a.

Next, a display device according to a ninth exemplary embodiment of the present invention will be described with reference to FIG. 31.

The display device according to the ninth exemplary embodiment of the present invention has lots of same parts as the seventh exemplary embodiment, so that the description of the same parts will be omitted but only different parts will be described below. The significant difference from the seventh exemplary embodiment is that the main emission direction 600 of light emitted from the light source 211 is not parallel with the display panel 100, which will be described in more detail.

Figure 31:
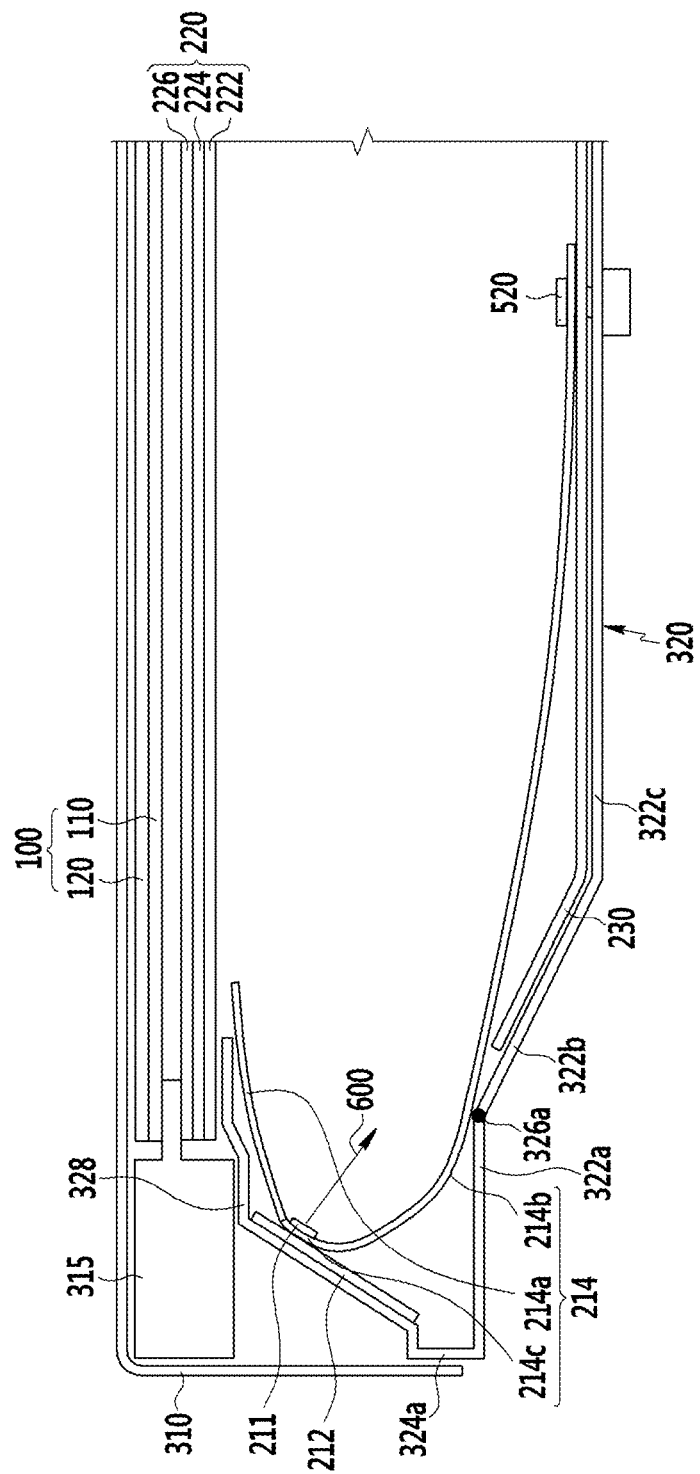
FIG. 31 is an enlarged cross-sectional view showing a portion of a display device according to a ninth exemplary embodiment of the present invention.

FIG. 31 is an enlarged cross-sectional view showing a portion of a display device according to a ninth exemplary embodiment of the present invention.

A partial area of the first side 324a of the lower cover 320 of the display device according to the ninth exemplary embodiment of the present invention may be formed to form a predetermined angle with a direction vertical with respect to the display panel 100.

For example the first side 324a of the lower cover 320 may be provided in a bending shape. In a portion connecting to the first bottom surface 322a, the first side 324a is formed in a direction vertical to the display panel 100. The above portion is covered by the upper cover 310, and may be used as a coupling point of the upper cover 310 and the lower cover 320.

Next, the first side 324a is bent and formed to form a predetermined angle with the direction vertical to the display panel 100. The above portion is connected to the circuit board 212, and the light source 211 is formed on the front surface of the circuit board 212. Accordingly, the main emission direction 600 of light emitted from the light source 211 is not parallel with the display panel 100 and forms the predetermined angle therewith. The light source 211 may be disposed so that the main emission direction 600 of light may face the bottom surface of the lower cover 320. Accordingly, by further decreasing an amount of light emitted from the light source 211 and directly incident on the display panel 100, it is possible to prevent light leakage from occurring at the edge of the display panel 100.

As shown in FIG. 31, the light source 211 may be disposed to be positioned on an upper side on the front surface of the circuit board 212. As shown in the drawing associated with the aforementioned exemplary embodiment, the light source 211 may be disposed to be positioned on the middle on the front surface of the circuit board 212. That is, a position of the light source 211 on the circuit board 212 may be variously modified.

The first reflection portion 214a formed to surround the upper side of the main emission direction 600 of light is provided in a curved shape and may be provided in an upwardly convex shape.

As described above with the exemplary embodiment, the first reflection portion 214a may be made of a transflective material that enables a portion of light to pass through. For example, at least a portion of the first reflection portion 214a may include PC or PMMA. The entire first reflection portion 214a may be made of a transparent mold material. The reflection sheet 219 may be attached to a partial area of the first reflection portion 214a.

Further, the entire first reflection portion 214a may be made of a reflective material. When the entire first reflection portion 214a is made of a reflective material, a length of the first reflection portion 214a may be formed to be shorter.

Next, a display device according to a tenth exemplary embodiment of the present invention will be described with reference to FIG. 32.

The display device according to the tenth exemplary embodiment of the present invention has lots of same parts as the ninth exemplary embodiment, so that the description of the same parts will be omitted but only different parts will be described below. The significant difference from the ninth exemplary embodiment is a shape of the first reflection portion 214a, which will be described in more detail.

Figure 32:
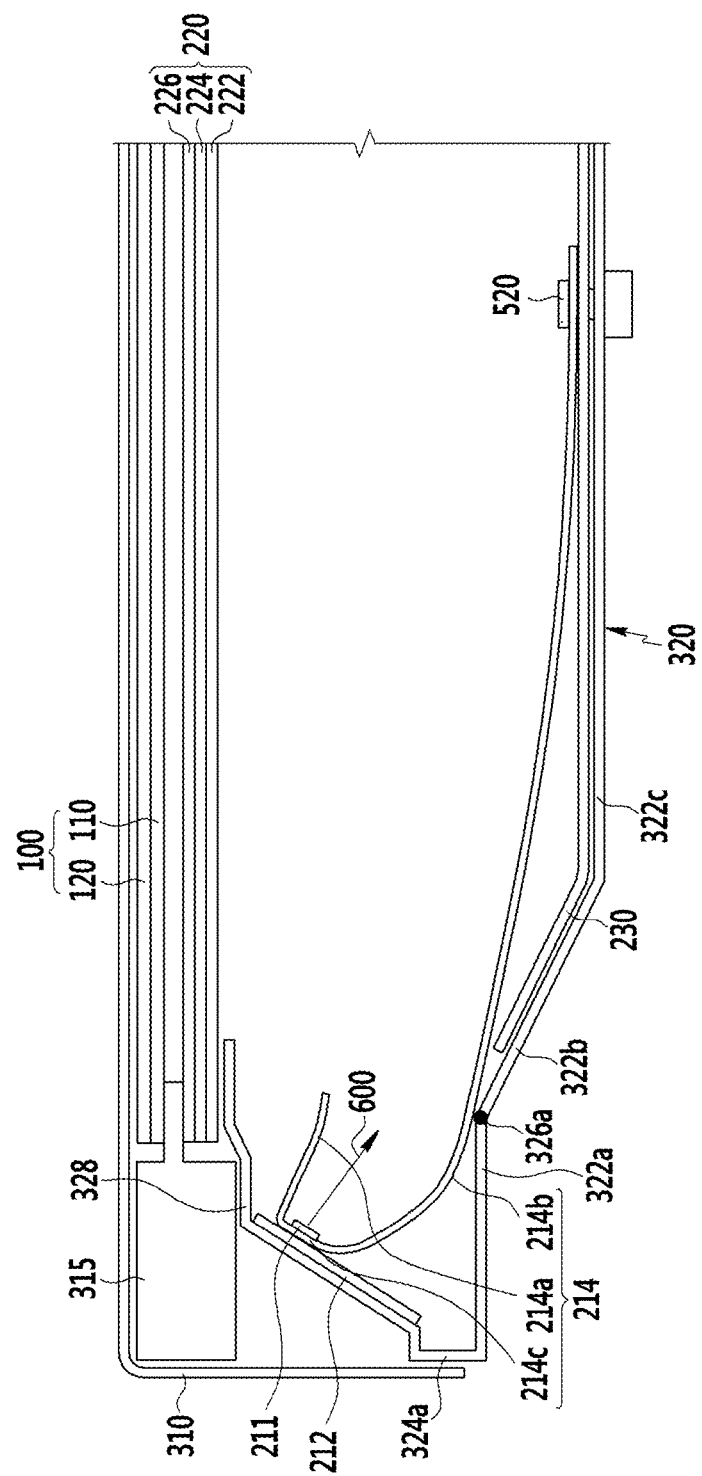
FIG. 32 is an enlarged cross-sectional view showing a portion of a display device according to a tenth exemplary embodiment of the present invention.

FIG. 32 is an enlarged cross-sectional view showing a portion of a display device according to a tenth exemplary embodiment of the present invention.

The light source 211 of the display device according to the tenth exemplary embodiment of the present invention is disposed so that the main emission direction 600 of light faces the bottom surface of the lower cover 320. Therefore, the main emission direction 600 of light emitted from the light source 211 is not parallel with the display panel 100 and forms a predetermined angle therewith.

The first reflection portion 214a formed to surround an upper side of the main emission direction 600 of light may be bended to have a downwardly convex shape.

As described above, a material of the first reflection portion 214a may be variously modified.

Next, a display device according to an eleventh exemplary embodiment of the present invention will be described with reference to FIG. 33.

The display device according to the eleventh exemplary embodiment of the present invention has lots of same parts as the ninth exemplary embodiment, so that the description of the same parts will be omitted but only different parts will be described below. The significant difference from the ninth exemplary embodiment is a shape of the first reflection portion 214a, which will be described in more detail.

Figure 33:
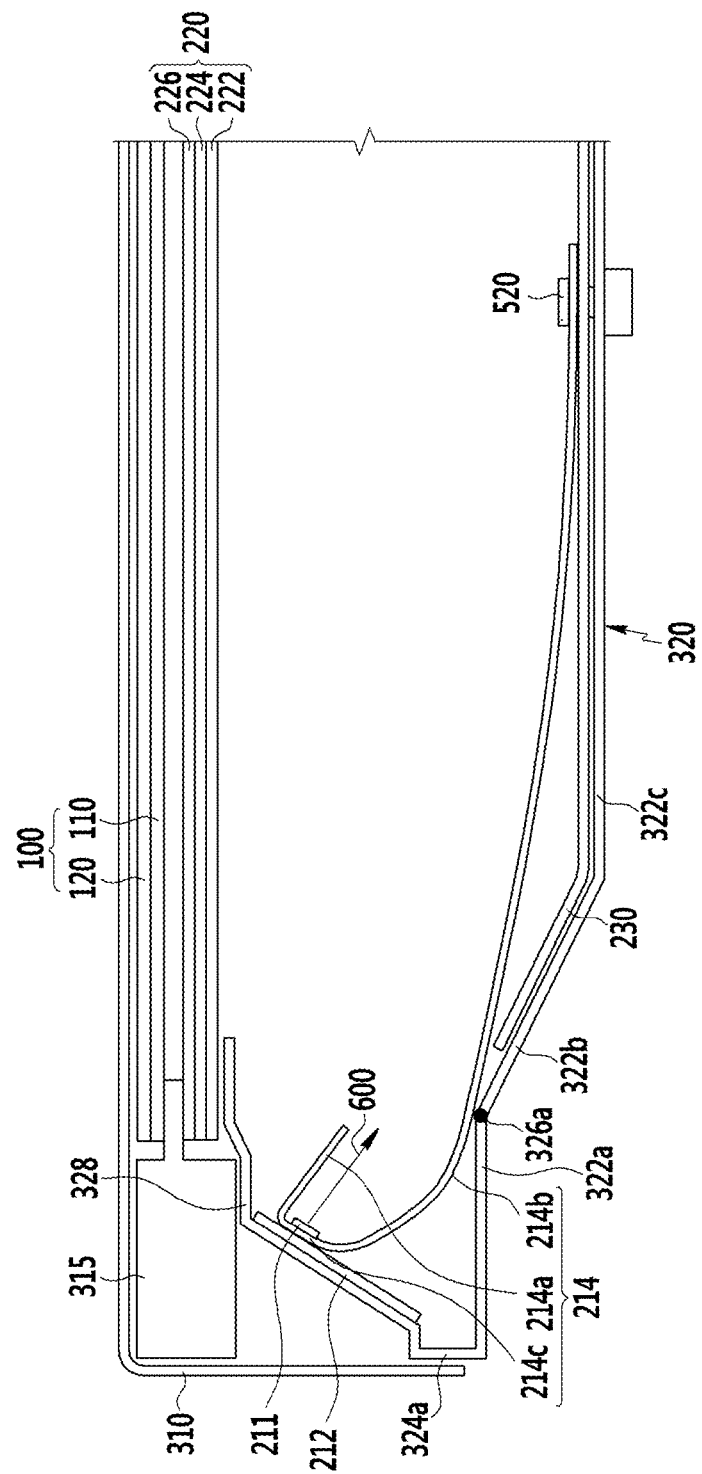
FIG. 33 is an enlarged cross-sectional view showing a portion of a display device according to an eleventh exemplary embodiment of the present invention.

FIG. 33 is an enlarged cross-sectional view showing a portion of a display device according to an eleventh exemplary embodiment of the present invention.

The light source 211 of the display device according to the eleventh exemplary embodiment of the present invention is disposed so that the main emission direction 600 of light faces the bottom surface of the lower cover 320. Therefore, the main emission direction 600 emitted from the light source 211 is not parallel with the display panel 100 and forms a predetermined angle therewith.

The first reflection portion 214a formed to surround the upper side of the main emission direction 600 of light may be formed to be flat instead of being bent. The first reflection portion 214a may be formed in a direction parallel with the main emission direction 600 of light.

As described above, a material of the first reflection portion 214a may be variously modified.

A light source in the ninth exemplary embodiment to the eleventh exemplary embodiment is disposed so that a main emission direction of light forms a predetermined angle with a display panel. Hereinafter, luminance of a light-incident portion varying according to an angle which the main emission direction of light forms with the display panel will be described with reference to FIG. 34.

Figure 34:
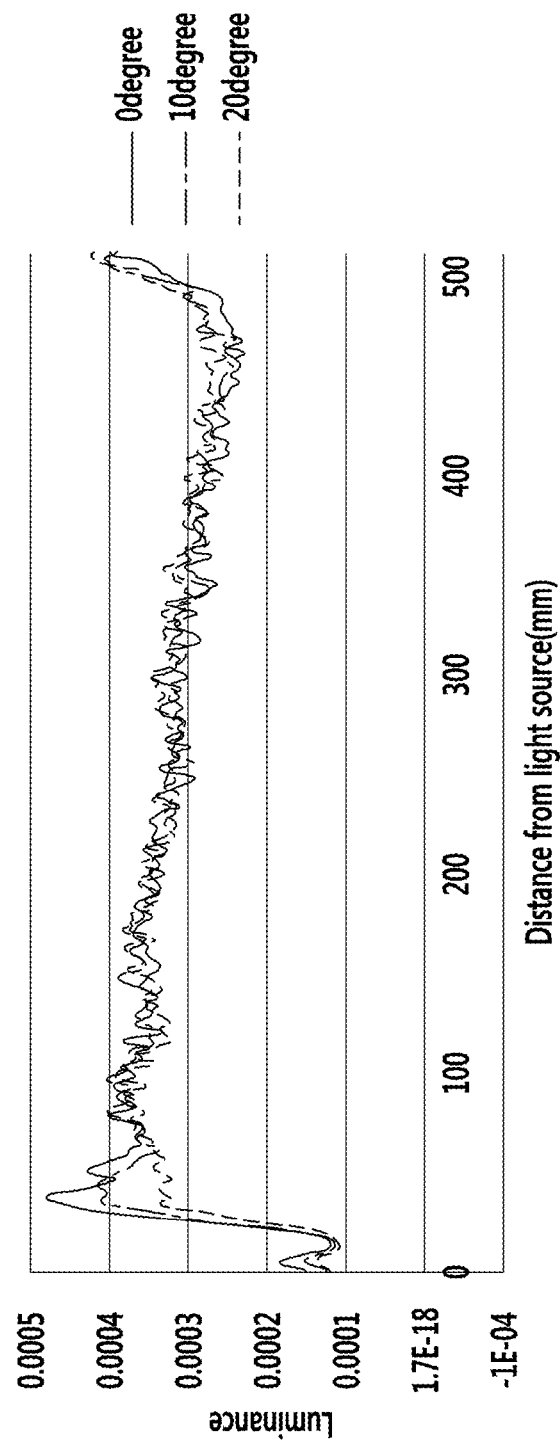
FIG. 34 is a graph showing luminance based on a distance from a light source when angles, which a main emission direction of light forms with a display panel are 0 degrees, 10 degrees, and 20 degrees.

FIG. 34 is a graph showing luminance based on a distance from a light source when angles, which a main emission direction of light forms with a display panel, are 0 degrees, 10 degrees, and 20 degrees.

When an angle which the main emission direction of light forms with the display panel is 0 degrees, that is, when the main emission direction of light is parallel with the display panel, luminance is very high at a point where a distance from the light source is between about 30 mm and about 50 mm. That is, light leakage occurs around the light-incident portion.

Compared to the case where the angle which the main emission direction of light forms with the display panel is 0 degrees, when the angle which the main emission direction of light forms with the display panel is 10 degrees, it can be verified that luminance has decreased at a point where the distance from the light source is between about 30 mm and about 50 mm. That is, by disposing the light source so that the main emission direction of light may form a predetermined angle with the display panel, it is possible to decrease light leakage of the light-incident portion.

When the angle which the main emission direction of light forms with the display panel is 20 degrees, it can be verified that luminance has further decreased at a point where the distance from the light source is between about 30 mm and about 50 mm compared to a case where the angle which the main emission direction of light forms with the display panel is 10 degrees. Also, it can be verified that the luminance is similar or lower compared to other points. Accordingly, when the angle which the main emission direction of light forms with the display panel exceeds 20 degrees, it is possible to predict that a corresponding portion may be visible as a dark portion in the light-incident portion.

Accordingly, the light source may be disposed so that the main emission direction of light may form an angle of more than 0 degrees and 20 degrees or less with the display panel.

Shapes of the first reflection portion in the ninth exemplary embodiment to the eleventh exemplary embodiment are respectively different. Hereinafter, luminance of the light-incident portion varying based on a shape of the first reflection portion will be described with reference to FIG. 35.

Figure 35:
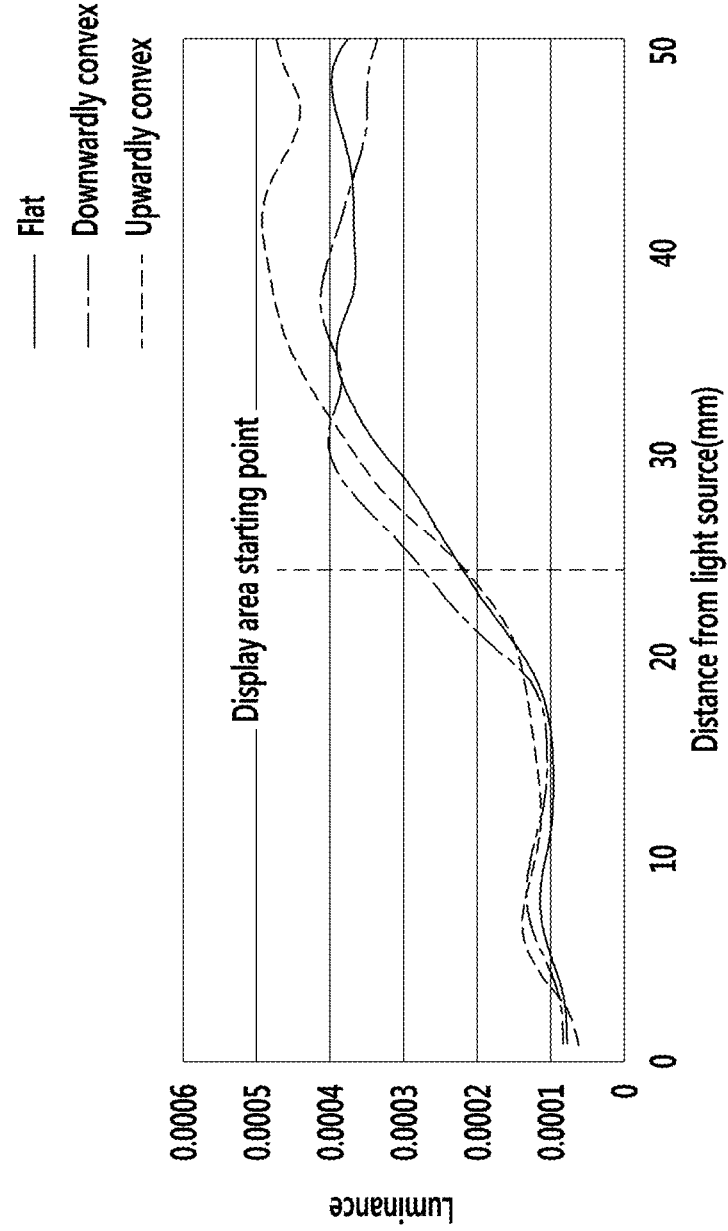
FIG. 35 is a graph showing luminance based on a distance from a light source in the case where a shape of a first reflection portion is flat, downwardly convex, and upwardly convex.

FIG. 35 is a graph showing luminance based on a distance from a light source in the case where a shape of a first reflection portion is flat, downwardly convex, and upwardly convex.

In the ninth exemplary embodiment, the first reflection portion is provided in an upwardly convex shape. In the tenth exemplary embodiment, the first reflection portion is provided in a downwardly convex shape. In the eleventh exemplary embodiment, the first reflection portion is provided in a flat shape.

At a point where a distance from the light source is between about 30 mm and about 40 mm, it can be verified that luminance of a case where the first reflection portion is provided in the downwardly convex or upwardly convex shape is higher than luminance of a case where the first refection portion is provided in the flat shape.

Accordingly, even though luminance difference of the light-incident portion according to the shape of the first reflection portion is not great, particularly, the shape of the first reflection portion that is provided in a bending shape rather than the flat shape is advantageous to decrease the dark portion of the light-incident portion.

Next, a display device according to a twelfth exemplary embodiment of the present invention will be described with reference to FIG. 36.

The display device according to the twelfth exemplary embodiment of the present invention has lots of same parts as the seventh exemplary embodiment, so that the description of the same parts will be omitted but only different parts will be described below. The significant difference from the seventh exemplary embodiment is that a reflector is not separately formed, which will be described in more detail.

Figure 36:
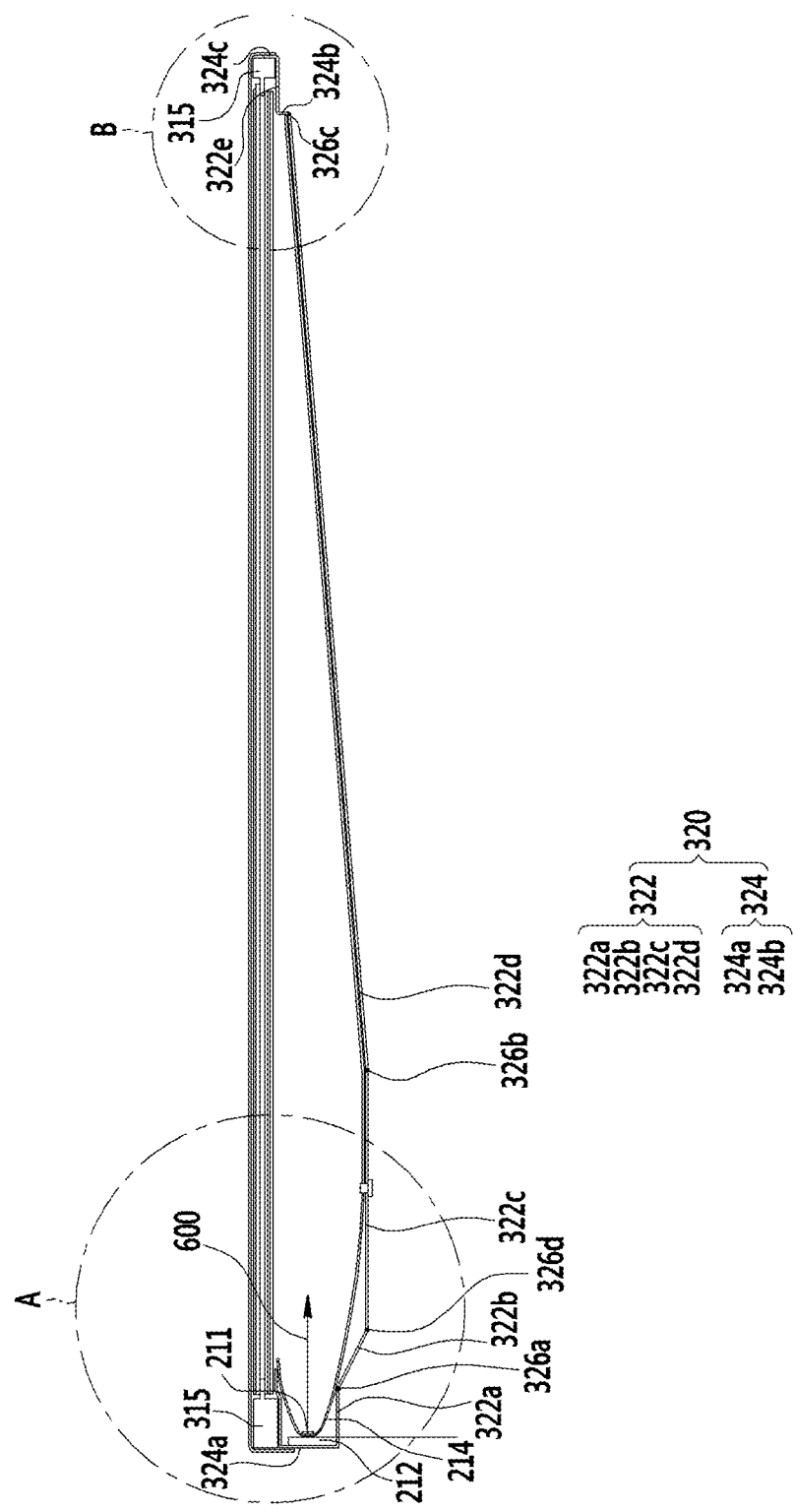
FIG. 36 is an enlarged cross-sectional view showing a portion of a display device according to a twelfth exemplary embodiment of the present invention.

FIG. 36 is an enlarged cross-sectional view showing a portion of a display device according to the twelfth exemplary embodiment of the present invention.

In the display device according to the twelfth exemplary embodiment of the present invention, a reflector is not separately formed and the second reflection portion 214b of the reflection cover 214 may be formed to be longer. The second reflection portion 214b may be formed to overlap the entire area of the display panel 100. Particularly, the second reflection portion 214b may be formed to overlap the entire display area of the display panel 100. The second reflection portion 214b may be fixed to the second bottom surface 322c of the lower cover 320 by the second fastening member 520. The second reflection portion 214b may be disposed directly on the lower cover 320 from a fixed point to reach the second side 324b of the lower cover 320. The second reflection portion 214b may also be formed to bend at the second bending portion 326b of the lower cover 320. The second reflection portion 214b disposed on the second inclined portion 322d of the lower cover 320 is disposed in an inclined shape along inclination of the second inclined portion 322d.

Next, a display device according to a thirteenth exemplary embodiment of the present invention will be described with reference to FIG. 37.

The display device according to the thirteenth exemplary embodiment of the present invention has lots of same parts as the seventh exemplary embodiment, so that the description of the same parts will be omitted but only different parts will be described below. A significant difference from the seventh exemplary embodiment is that a light adjustment pattern is formed on the reflection cover 214, which will be described in more detail.

Figure 37:
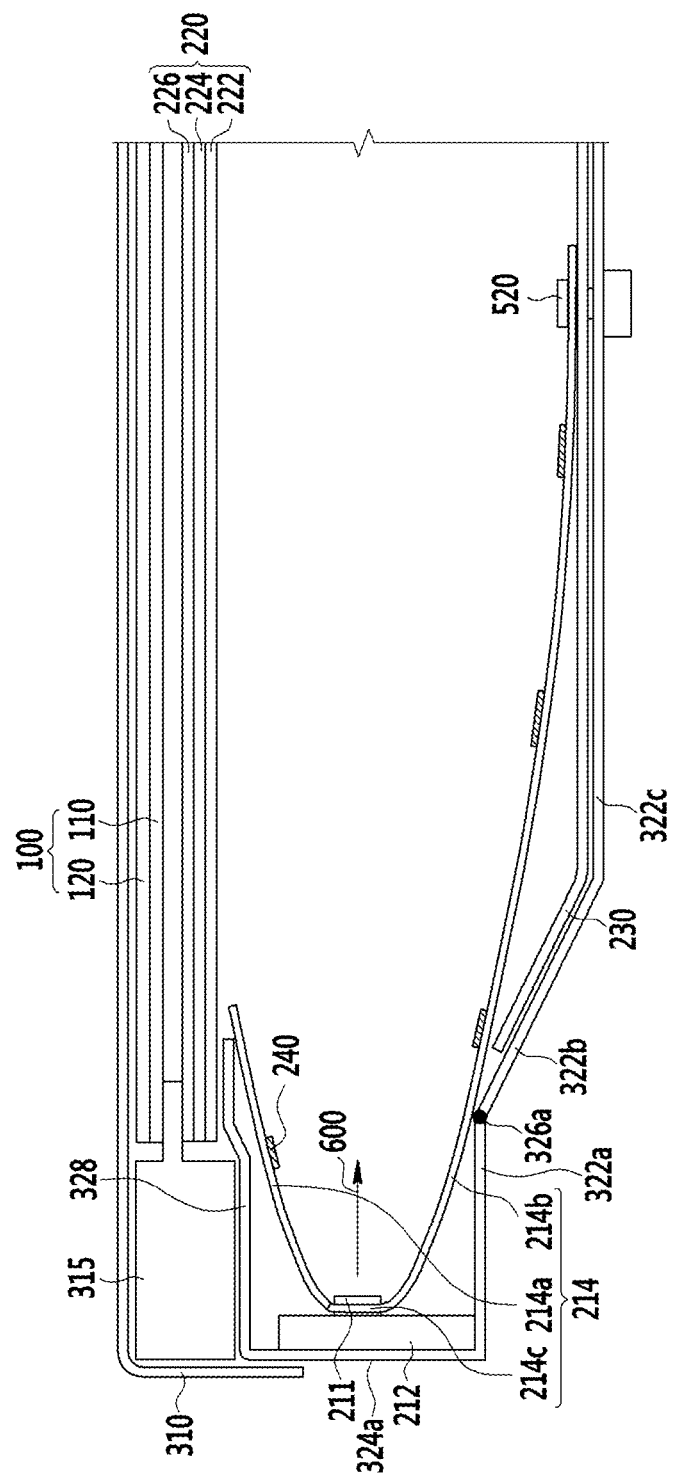
FIG. 37 is an enlarged cross-sectional view showing a portion of a display device according to a thirteenth exemplary embodiment of the present invention.

FIG. 37 is an enlarged cross-sectional view showing a portion of a display device according to a thirteenth exemplary embodiment of the present invention.

A light adjustment pattern 240 may be further formed on the light-incident surface of the reflection cover 214 of the display device according to the thirteenth exemplary embodiment of the present invention.

Distribution of Light output through an upper surface of the display panel 100 may appear to have a particularly bright portion in a partial area. In this case, a path of light from the light source 211 to reach the bright portion on the display panel 100 may be back-traced. The light adjustment pattern 240 may be attached to a point that meets the reflection cover 214 in the back-traced path of light. When light emitted from the light source 211 reaches the light adjustment pattern 240, a portion of the light is absorbed by the light adjustment pattern 240, and remaining light is reflected and incident on the display panel 100. Accordingly, it is possible to decrease an amount of light of a portion that appears as the bright portion and thus, it is possible to increase uniformity of light over the entire display panel 100.

The particularly bright portion on the upper surface of the display panel 100 may appear in a plurality of areas and thus, the light adjustment pattern 240 may also be formed at a plurality of points. Further, when there is a point where light of some wavelengths appears to be bright, it is also possible to use the light adjustment pattern 240 capable of decreasing the amount of light of some wavelengths.

FIG. 37 discloses a structure in which the light adjustment pattern 240 is added to the same structure as the seventh exemplary embodiment, but the present invention is not limited thereto. The light adjustment pattern 240 may be additionally formed to a structure of another exemplary embodiment and further, may also be additionally formed to the aforementioned structures of comparative example 1 and comparative example 2. That is, various modifications are possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a display panel;
   a backlight assembly supplying light to the display panel; and
   a lower cover receiving the backlight assembly,
   wherein the backlight assembly includes:
      a light source;
      a circuit board mounted with the light source; and
      a reflection cover coupled to the circuit board,
   the reflection cover includes:
      a first reflection portion formed to surround an upper side of a main emission direction of light emitted from the light source;
      a second reflection portion formed to surround a lower side of the main emission direction of the light; and
      a connection portion connecting the first reflection portion and the second reflection portion, and
   wherein the lower cover is formed in one piece and includes a first inclined surface, a side surface, a first flat bottom surface, a second inclined surface, and a second flat bottom surface,
   wherein the side surface is disposed between the first inclined surface and the first flat bottom surface, and the second inclined surface is disposed between the first flat bottom surface and the second flat bottom surface, and
   wherein the light source is mounted on the first inclined surface and the main emission direction of the light is directed towards the second flat bottom surface.

2. The display device of claim 1, wherein:
   the first reflection portion has a bending shape.

3. The display device of claim 2, wherein:
   the first reflection portion is provided in an upwardly convex shape.

4. The display device of claim 2, wherein:
   the first reflection portion is provided in a downwardly convex shape.

5. The display device of claim 1, wherein:
   the first reflection portion is formed to be flat in a direction parallel with the main emission direction of the light.

6. The display device of claim 1, wherein:
   the light source is disposed so that an angle, which the main emission direction of the light forms with the display panel, is more than 0 degrees and 20 degrees or less.

7. The display device of claim 1, wherein:
   at least a portion of the first reflection portion is made of a material that enables a portion of the light to pass through.

8. The display device of claim 7, wherein:
   at least a portion of the first reflection portion includes PC or PMMA.

9. The display device of claim 1, wherein:
   the first reflection portion is made of a reflective material.

10. The display device of claim 1, wherein the lower cover further includes an upper surface connected to the first inclined surface.

11. The display device of claim 10, wherein the upper surface extends substantially parallel to the display panel toward the display panel.

* * * * *